(12) United States Patent
Peleg et al.

(10) Patent No.: US 10,710,312 B2
(45) Date of Patent: Jul. 14, 2020

(54) INDUCTION WELDABLE PIPE CONNECTOR HAVING THERMALLY INSULATED INDUCTION WELDABLE SOCKET MOUTH RIMS

(71) Applicant: HULIOT AGRICULTURAL COOPERATIVE SOCIETY LTD, Upper Galilee (IL)

(72) Inventors: Ronen Peleg, Upper Galilee (IL); Oren Yogev, Upper Galilee (IL); Yariv Fichtelberg, Lower Galilee (IL)

(73) Assignee: HULIOT AGRICULTURAL COOPERATIVE SOCIETY LTD, Upper Galilee (IL)

( * ) Notice: Subject to any disclaimer, the term of this patent is extended or adjusted under 35 U.S.C. 154(b) by 0 days.

(21) Appl. No.: 16/490,191

(22) PCT Filed: Mar. 12, 2018

(86) PCT No.: PCT/IL2018/050288
§ 371 (c)(1),
(2) Date: Aug. 30, 2019

(87) PCT Pub. No.: WO2018/167779
PCT Pub. Date: Sep. 20, 2018

(65) Prior Publication Data
US 2020/0009799 A1  Jan. 9, 2020

(30) Foreign Application Priority Data

Mar. 13, 2017  (IL) .......................................... 251129
Mar. 13, 2017  (IL) .......................................... 251130

(51) Int. Cl.
*B29C 65/00*  (2006.01)
*B29C 65/02*  (2006.01)
(Continued)

(52) U.S. Cl.
CPC ........ *B29C 65/3656* (2013.01); *B29C 65/368* (2013.01); *B29C 65/561* (2013.01);
(Continued)

(58) Field of Classification Search
CPC ............ B29C 65/3656; B29C 65/3668; B29C 66/72321; B29C 66/81423;
(Continued)

(56) References Cited

U.S. PATENT DOCUMENTS

| 1,316,190 A | 9/1919 | Sackerman |
| 3,428,769 A | 2/1969 | Ciszewski et al. |

(Continued)

FOREIGN PATENT DOCUMENTS

| CN | 102159867 A | 8/2011 |
| DE | 29706501 U1 | 10/1997 |

(Continued)

*Primary Examiner* — Quang T Van
(74) *Attorney, Agent, or Firm* — Novick, Kim & Lee, PLLC; Harold L. Novick

(57) ABSTRACT

Induction Weldable Pipe Connectors (IWPCs) (400) for electromagnetic induction welding with at least one plastic pipe (30). IWPCs (400) include a tubular induction weldable mounting (401) having an opposite pair of induction weldable sockets (404A, 404B), a tubular cover (406) externally mounted on the induction weldable mounting (401), and a tubular pipe tang (407) internally disposed in one induction weldable socket (404A, 404B) for destining an induction weldable socket (404A, 404B) as an induction weldable pipe socket (408A, 408B) for forced sliding insertion of a pipe end (31) thereinto. The cover (406) includes an opposite pair of thermally insulated induction weldable socket mouth rims (426A, 426B) for entrapping melted solder lining (412) inside the induction weldable mounting (401) during an electromagnetic induction welding operation, thereby ensuring improved welding.

10 Claims, 17 Drawing Sheets

(51) Int. Cl.
*B29C 65/34* (2006.01)
*B29C 65/36* (2006.01)
B29C 65/56 (2006.01)
B29C 65/72 (2006.01)
B29K 705/02 (2006.01)

(52) U.S. Cl.
CPC .......... *B29C 65/72* (2013.01); *B29C 66/3242* (2013.01); *B29C 66/72321* (2013.01); *B29K 2705/02* (2013.01)

(58) Field of Classification Search
CPC .......... B29C 66/52298; B29C 66/5344; B29C 65/368; B29C 66/5221; B29C 66/52292; B29C 66/52295; B29C 66/972; B29C 66/1222; B29C 66/1224; B29C 66/735; B29C 66/83241; B29C 66/8221; B29C 66/8264; B29C 66/8286; B29C 65/561; B29C 66/71; F16L 13/0209; F16L 47/02; B29K 2023/065; B29K 2027/06; B29K 2023/12; B29K 2023/0691
USPC ....... 219/644, 617, 433, 634, 643, 635, 603, 219/607, 616, 552, 553, 535, 544; 156/28, 224.22, 224.24, 267, 272.4, 285, 156/292, 397.7, 379.8; 285/288.1, 21.2
See application file for complete search history.

(56) References Cited

U.S. PATENT DOCUMENTS

| | | |
|---|---|---|
| 4,634,844 A | 1/1987 | Lodder et al. |
| 5,125,690 A | 6/1992 | Taylor et al. |
| 5,462,314 A | 10/1995 | Goto et al. |
| 5,466,916 A | 11/1995 | Iguchi et al. |
| 5,526,561 A | 6/1996 | McGaffigan |
| 6,293,311 B1 | 9/2001 | Bushi et al. |
| 6,509,555 B1 | 1/2003 | Riess et al. |
| 6,639,197 B2 | 10/2003 | Riess et al. |
| 6,639,198 B2 | 10/2003 | Riess et al. |
| 6,710,314 B2 | 3/2004 | Reiss et al. |
| 6,849,837 B2 | 2/2005 | Riess et al. |
| 6,875,966 B1 | 4/2005 | Barber et al. |
| 7,025,245 B2 | 4/2006 | Gust |
| 7,141,768 B2 | 11/2006 | Malofsky et al. |
| 7,220,948 B2 | 5/2007 | Holzer et al. |
| 7,344,161 B2 | 3/2008 | Howard et al. |
| 7,399,949 B2 | 7/2008 | Barber et al. |
| 7,491,916 B1 | 2/2009 | Barber et al. |
| 8,327,900 B2 | 12/2012 | Stauffer et al. |
| 8,424,924 B2 | 4/2013 | LaMarca et al. |
| 2002/0011305 A1 | 1/2002 | Malofsky et al. |
| 2003/0102671 A1 | 6/2003 | Fritze |
| 2004/0091694 A1 | 5/2004 | Holzer et al. |
| 2008/0029507 A1 | 2/2008 | Barber et al. |
| 2010/0084097 A1 | 4/2010 | Stauffer et al. |
| 2017/0015050 A1* | 1/2017 | Hooberman ........ B29C 66/7394 |

FOREIGN PATENT DOCUMENTS

| | | |
|---|---|---|
| EP | 0294008 A2 | 12/1988 |
| EP | 0333379 A2 | 9/1989 |
| EP | 0645234 A1 | 3/1995 |
| EP | 2172328 A1 | 4/2010 |
| GB | 2314597 A | 1/1998 |
| GB | 2384535 B | 6/2005 |
| JP | H05-118486 A | 5/1993 |
| JP | 05-340496 A | 12/1993 |
| JP | 06-74386 A | 3/1994 |
| JP | 06-174170 A | 6/1994 |
| JP | 6-278211 A | 10/1994 |
| JP | 6-278212 A | 10/1994 |
| JP | 6-281079 A | 10/1994 |
| JP | 7-269774 A | 10/1995 |
| JP | 9-170692 A | 6/1997 |
| JP | 10-278117 A | 10/1998 |
| JP | 2001-208274 A | 8/2001 |
| JP | 2008-111459 A | 5/2008 |
| WO | 91/09247 A1 | 6/1991 |
| WO | 2010/033163 A2 | 3/2010 |
| WO | 2012/137197 A2 | 10/2012 |
| WO | 2015/132783 A2 | 9/2015 |

* cited by examiner

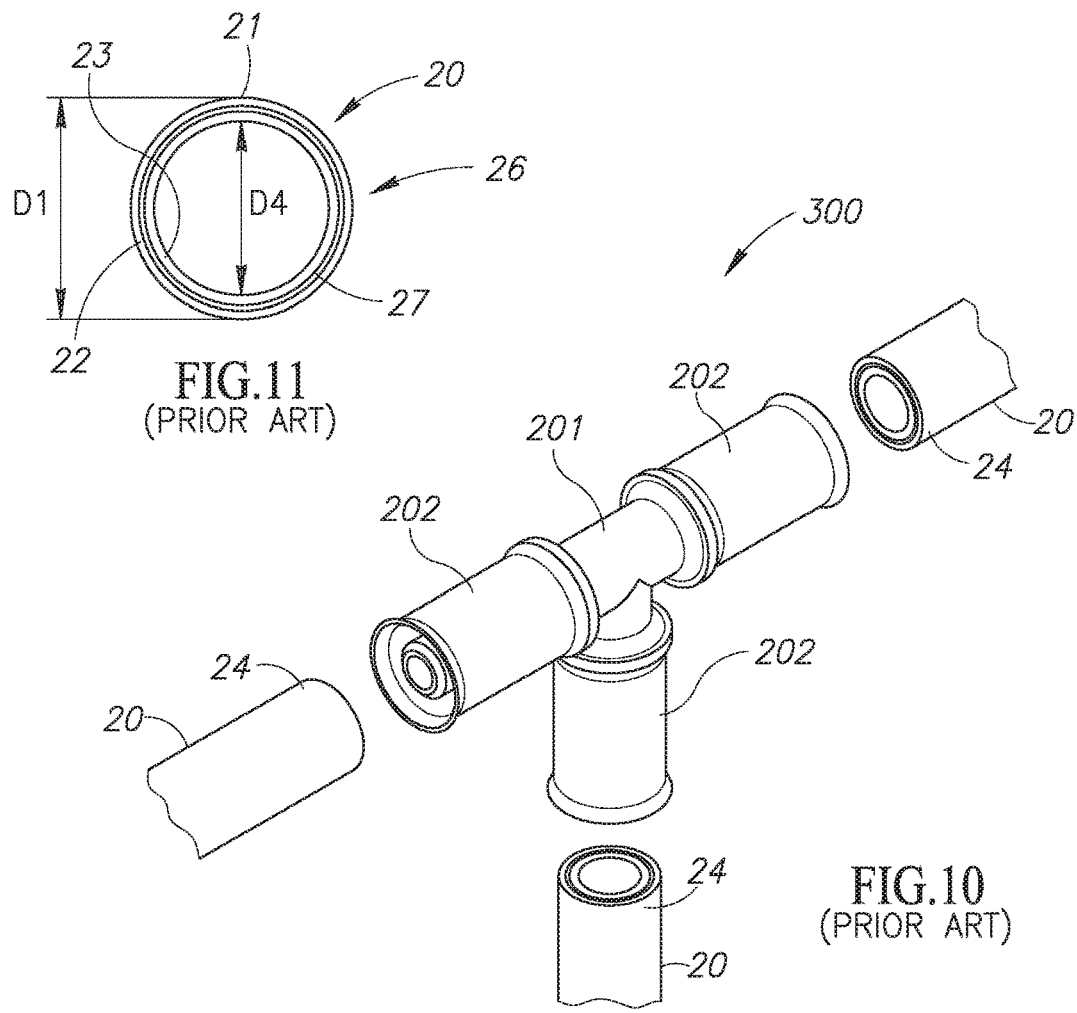
FIG.11 (PRIOR ART)
FIG.10 (PRIOR ART)
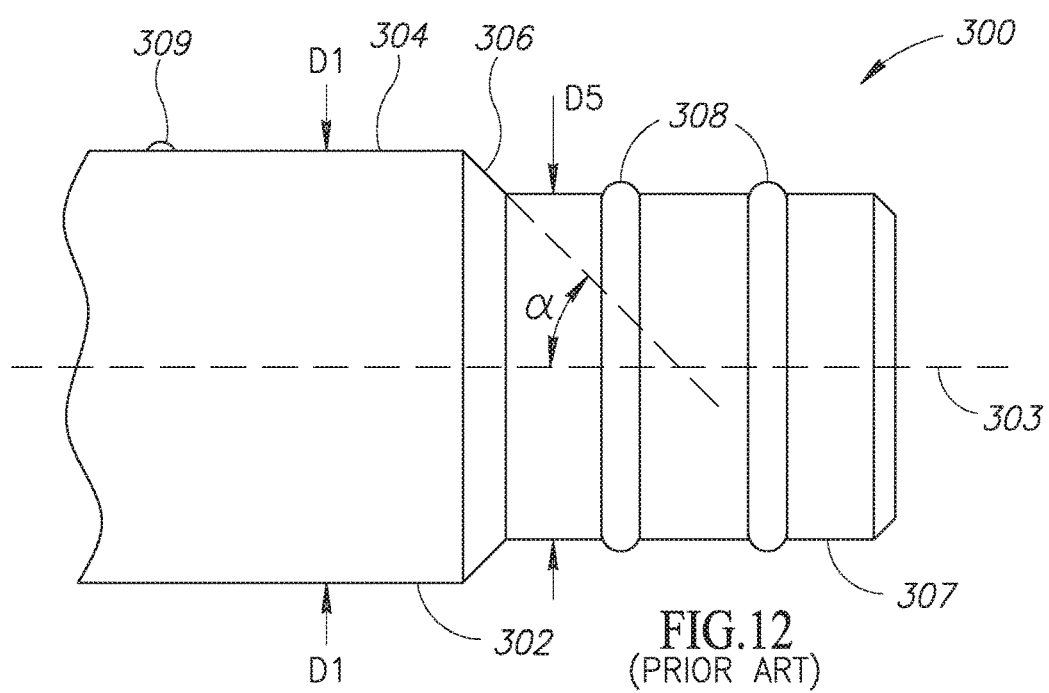
FIG.12 (PRIOR ART)

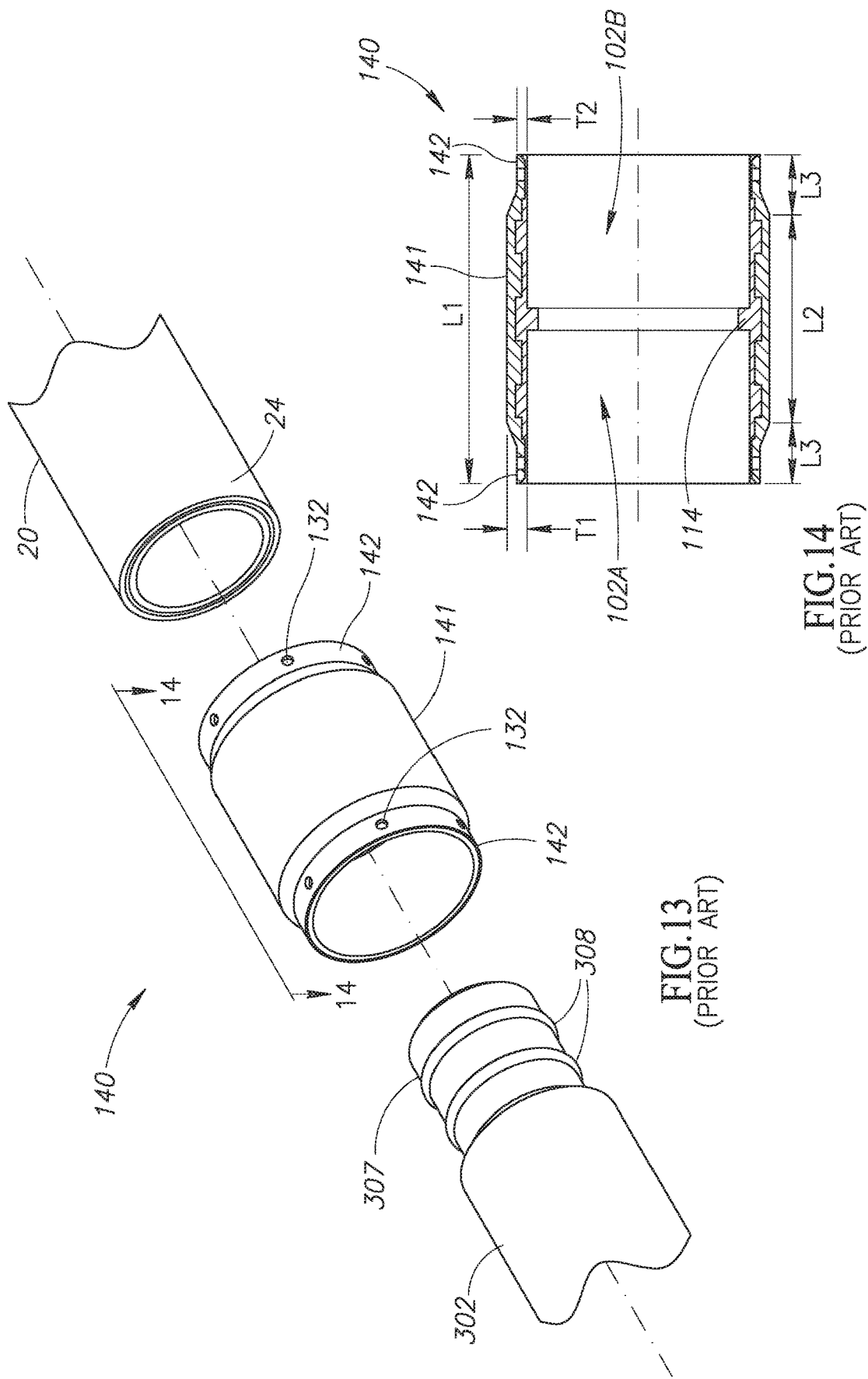

INDUCTION WELDABLE PIPE CONNECTOR HAVING THERMALLY INSULATED INDUCTION WELDABLE SOCKET MOUTH RIMS

FIELD OF THE INVENTION

The invention relates to electromagnetic induction welding of fluid distribution systems in general and Induction Weldable Pipe Connectors (IWPCs) for electromagnetic induction welding of plastic pipes in particular.

BACKGROUND OF THE INVENTION

Commonly owned WIPO International Publication No. WO 2012/137197 A2 entitled Electromagnetic Induction Welding of Plastic Pipe Fluid Distribution Systems discloses induction weldable pipe connectors and electromagnetic induction coil assemblies for use in clamping the induction weldable pipe connectors on plastic pipes. The plastic pipes can be made from thermoplastics including inter alia PVC, PP, PP-R, HDPE, and the like. And thermosetting plastics including PEX, and the like. The plastic pipes can be fabricated from a single plastic material throughout or alternatively have a multilayer composition to provide a better combination of mechanical and chemical properties. WO 2012/137197 induction weldable pipe connectors are described hereinbelow in greater detail with reference to FIG. 1 to FIG. 9.

Commonly owned WIPO International Publication No. WO 2015/132783 A2 entitled Electromagnetic Induction Welding of Fluid Distribution Systems discloses inter alia plastic installation fittings, Induction Weldable Pipe Connectors (IWPCs) having a major central pipe connector section and reduced thickness lateral pipe connector section pair, so-called assisted Induction Weldable Pipe Connectors (IWPCs) having an integral solder flow barrier, and ElectroMagnetic Induction (EMI) coil reverse action pliers. WO 2015/132783 plastic installation fittings are described hereinbelow in greater detail with reference to prior art FIG. 10 to FIG. 16. IWPCs having a major central pipe connector section and reduced thickness lateral pipe connector section pair are described hereinbelow in greater detail with reference to prior art FIG. 13 and FIG. 14. Assisted IWPCs having an integral solder flow barrier are described hereinbelow in greater detail with reference to FIG. 17 to FIG. 20.

There is a need for improved electromagnetic induction welding of plastic pipes.

SUMMARY OF THE INVENTION

Generally speaking, the present invention is directed towards improvements in WO 2015/132783's so-called assisted IWPCs including an integral solder flow barrier for preventing melted solder lining flowing radially inward into a plastic pipe lumen for reducing its internal pipe diameter thereby restricting flow therethrough. The IWPCs of the present invention include a three component construction as follows: First, a tubular induction weldable mounting having an opposite pair of induction weldable sockets. The induction weldable mounting has a solid ferromagnetic metal susceptor sleeve with an opposite pair of annular susceptor sleeve end faces and a thermoplastic solder lining extending beyond the susceptor sleeve and having an opposite pair of annular solder lining wraparound entrapping the opposite pair of annular susceptor sleeve end faces therewithin. Second, a tubular cover externally mounted on the induction weldable mounting for peripherally enveloping same and having an opposite pair of annular induction weldable socket mouth rims lateral to the opposite pair of annular solder lining wraparound rims such that they are thermally insulated from the susceptor sleeve. And third, a tubular pipe tang internally disposed in the induction weldable mounting for destining an induction weldable socket as an induction weldable pipe socket dimensioned for forced sliding insertion of a pipe end thereinto.

In use, application of electromagnetic induction energy to the induction welding mounting melts the solder lining which leads to its expansion. The increased volume of melted solder lining compared to its initial volume of unmelted solder lining leads to pressure buildup inside the induction weldable pipe connector by virtue of the melted solder lining being entrapped by the thermally insulated induction weldable socket mouth rims together with the tubular pipe tang, thereby ensuring improved sealed welding.

The cover is spaced apart from the induction weldable mounting thereby providing air insulation therebetween for ensuring the cover is only marginally heated by the susceptor sleeve during an electromagnetic induction welding operation. The cover preferably includes an array of ventilation holes for assisting convection cooling of a welded sealed joint. The ventilation holes meet international UL finger probe standards for preventing inadvertent user contact therethrough with a hot susceptor sleeve which can lead to serious user injury. The cover is also intended to provide visible user indications regarding advancement of a welding process until its successful conclusion.

IWPCs of the present invention can be destined for use with a multi-layer plastic pipe including an aluminum core layer between an external plastic layer and an internal plastic layer. Accordingly, the pipe tang has at least one O-ring for sealing against an internal peripheral pipe surface. The pipe tang of an IWPC intended for use with a multi-layer plastic pipe including an aluminum core layer is typically longer than a pipe tang for use with a plastic pipe without an aluminum core layer for enabling a spaced apart pair of O-rings therealong.

IWPCs of the present invention can be implemented for different connection purposes as follows: First, IWPCs can include an opposite pair of induction weldable pipe sockets for end-to-end electromagnetic induction welding of a plastic pipe pair both either with or without an aluminum core layer. Second, IWPCs can be in the form of pipe fittings including inter alia right angle elbow pipe fittings, T pipe fittings, Y pipe fittings, and the like, including at least two induction weldable pipe sockets wherein adjacent induction weldable pipe sockets subtend an included angle therebetween of less than 180°. And third, IWPCs can include a connector end with a screw thread similar to the aforementioned WO 2012/137197 FIG. 11's external screw thread and WO 2012/137197 FIG. 12's internal screw thread.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 10 corresponds to WO 2015/132783 FIG. 13;

FIG. 11 corresponds to WO 2015/132783 FIG. 11;

FIG. 12 corresponds to WO 2015/132783 FIG. 14;

FIG. 13 corresponds to WO 2015/132783 FIG. 15;

FIG. 14 corresponds to WO 2015/132783 FIG. 16;

DETAILED DESCRIPTION OF DRAWINGS

Figure 1:
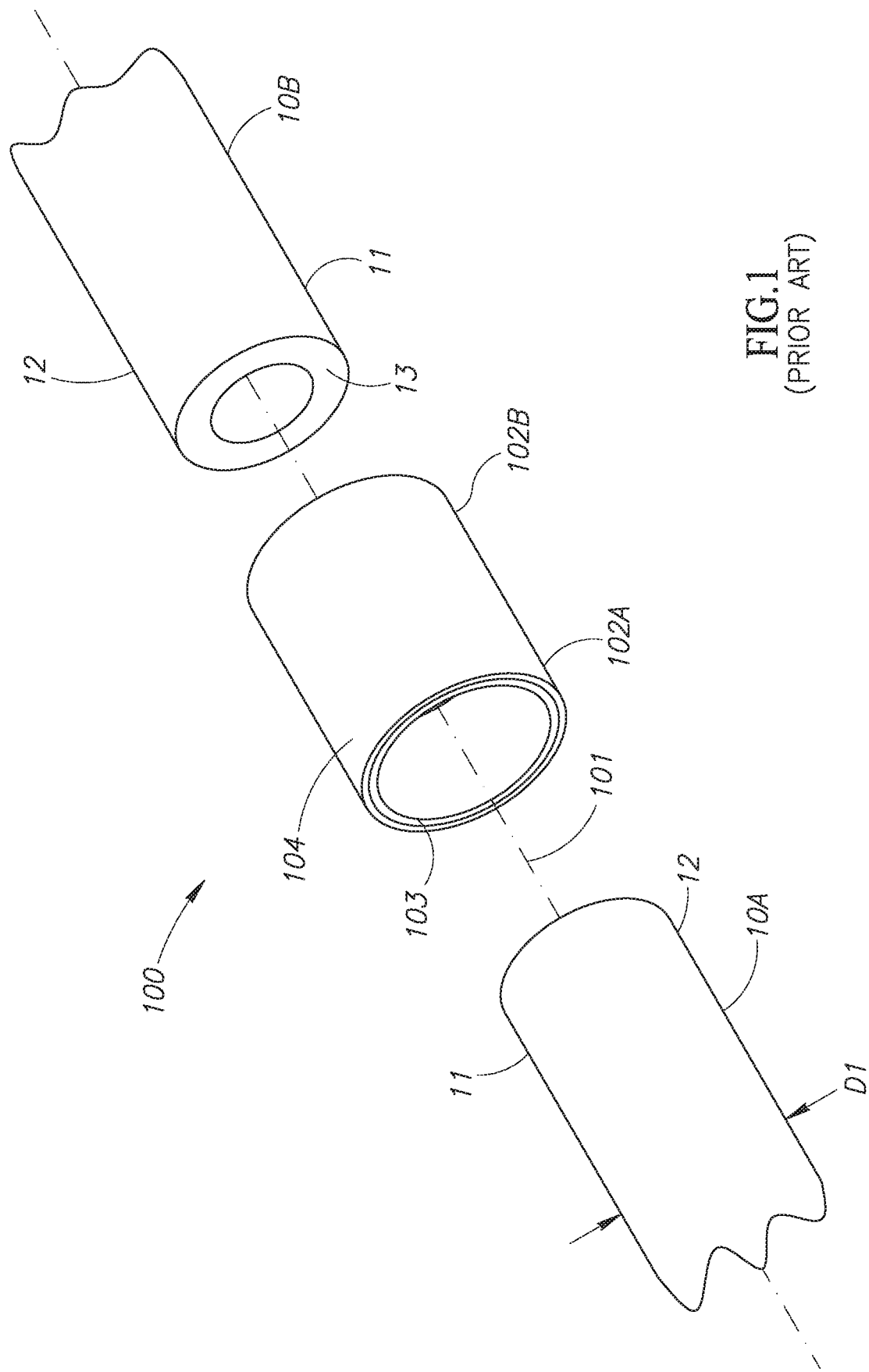
FIG. 1 corresponds to WO 2012/137197 FIG. 1.
Figure 2:
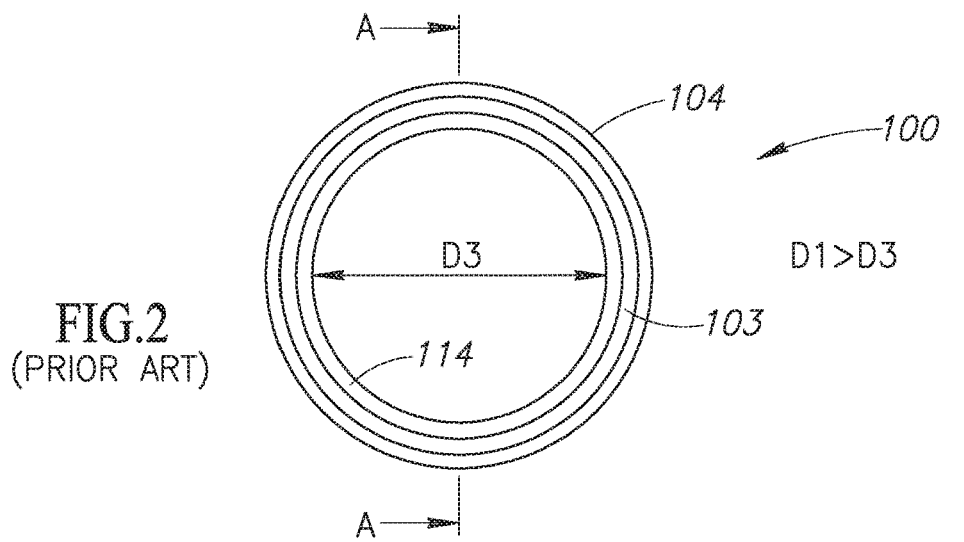
FIG. 2 corresponds to WO 2012/137197 FIG. 2.

Section 1: Commonly Owned WO 2012/137197 A2 Entitled Electromagnetic Induction Welding of Plastic Pipe Distribution Systems FIG. 1 to FIG. 4 show an induction weldable pipe connector 100 for electromagnetic induction welding to a pair of same diameter plastic pipes 10. The plastic pipes 10 have an external diameter D1 typically in the range of from 10 mm to 30 mm. The thermoplastic pipes 10 have pipe ends 11. The pipe ends 11 have peripheral external pipe end surfaces 12 and exposed annular pipe end faces 13. The plastic pipes 10 can be fabricated from a single plastic material throughout or alternatively have a multilayer composition.

The induction weldable pipe connector 100 has a longitudinal pipe connector axis 101 and includes two opposite induction weldable pipe sockets 102A and 102B each intended for forced sliding insertion of a pipe end 11 thereinto. The induction weldable pipe connector 100 has a two ply construction including an internal thermoplastic solder lining 103 and a solid ferromagnetic metal susceptor sleeve 104 entirely peripherally enveloping the internal thermoplastic solder lining 103.

The solder lining 103 has a patterned external solder lining surface 106, an internal solder lining surface 107 and a pair of solder lining end faces 108. The solder lining 103 is made of thermoplastic material for welding with thermoplastic pipes 10. The solder lining 103 has an internal diameter D2. The diameters D1 and D2 are such that a pipe end 11 requires forced sliding inserted into a pipe socket 102 for preloading same. Such preloading ensures that melting of solder lining 103 leads in turn to melting of the peripheral external pipe end surfaces 12 thereby welding them together.

The susceptor sleeve 104 is preferably formed from steel to ensure uniform heating of its solder lining 103. The susceptor sleeve 104 has an external susceptor sleeve surface 109, a patterned internal susceptor sleeve surface 111 and a pair of susceptor sleeve end faces 112. The external susceptor sleeve surface 109 is an exposed metal surface which can be printed with technical specification details including inter alia length, internal diameter, external diameter, and the like.

Figure 3:
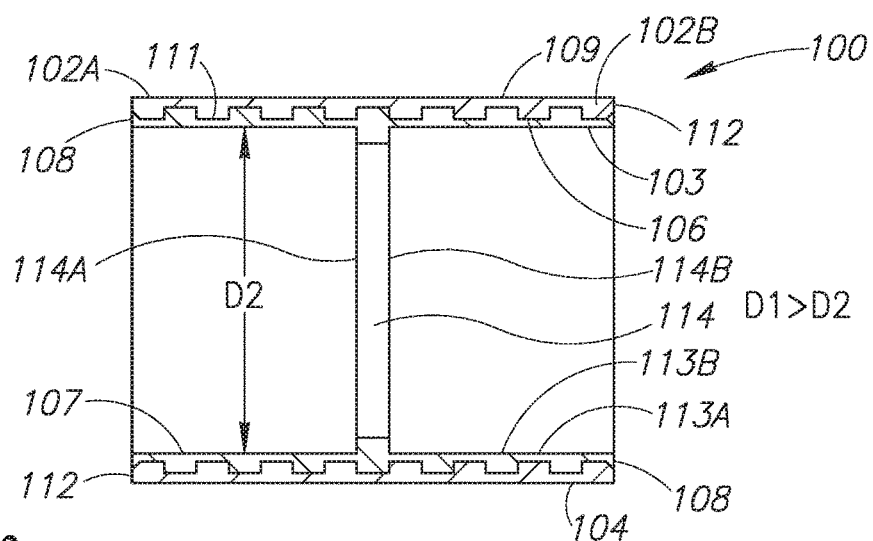
FIG. 3 corresponds to WO 2012/137197 FIG. 3 and is a longitudinal cross section of FIG. 1's induction weldable pipe connector along line A-A in FIG. 2.
Figure 4:
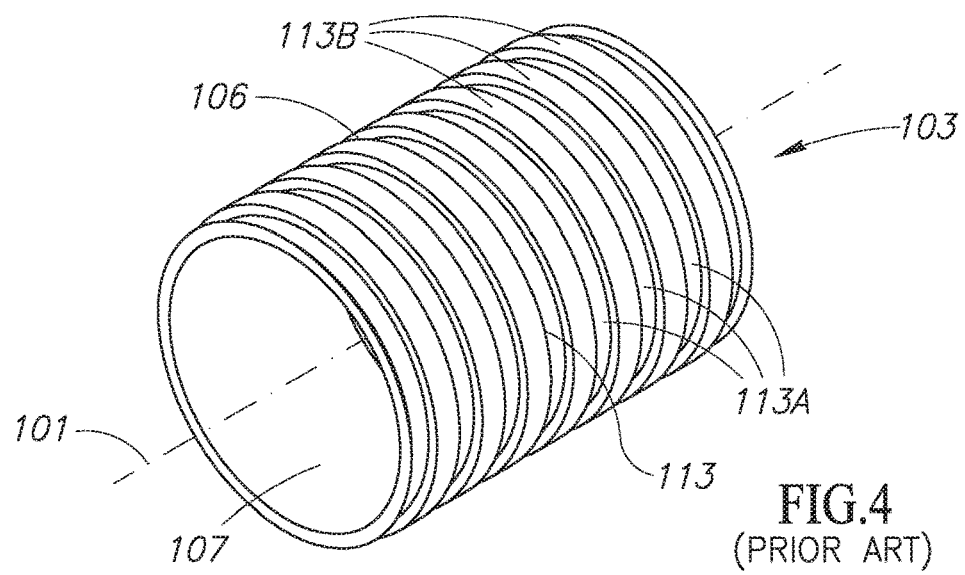
FIG. 4 corresponds to WO 2012/137197 FIG. 4.

The patterned external solder lining surface 106 and the patterned internal susceptor sleeve surface 111 are in intimate complementary interlocking contact to facilitate heat transfer from the susceptor sleeve 104 to the solder lining 103. FIG. 3 and FIG. 4 show a series of staggered different diameter adjacent rings 113 along the longitudinal pipe connector axis 101. Alternative interlocking patterns include inter alia castellated surfaces, grooved surfaces, and the like.

The solder lining 103 is formed with a central inwardly directed stop 114 having an internal diameter D3 wherein D1>D2>D3 such that the pipe ends 11 stop against the inwardly directed stop 114 on their forced sliding insertion into the pipe connector 100. The inwardly directed stop 114 includes a first abutment surface 114A facing the induction weldable pipe socket 102A and a second abutment surface 114B facing the induction weldable pipe socket 102B. The inwardly directed stop 114 is preferably annular.

Figure 5:
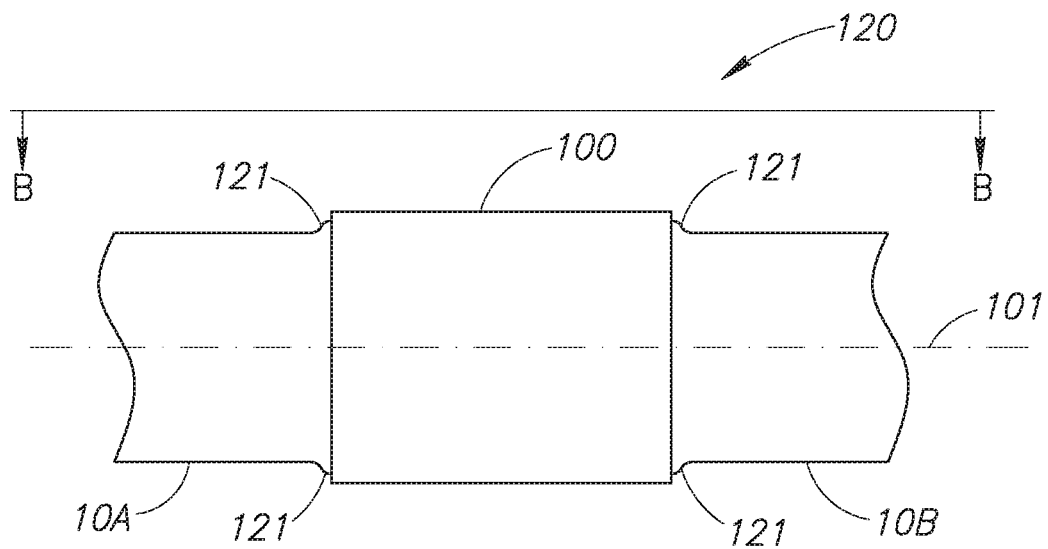
FIG. 5 corresponds to WO 2012/137197 FIG. 5.
Figure 6:
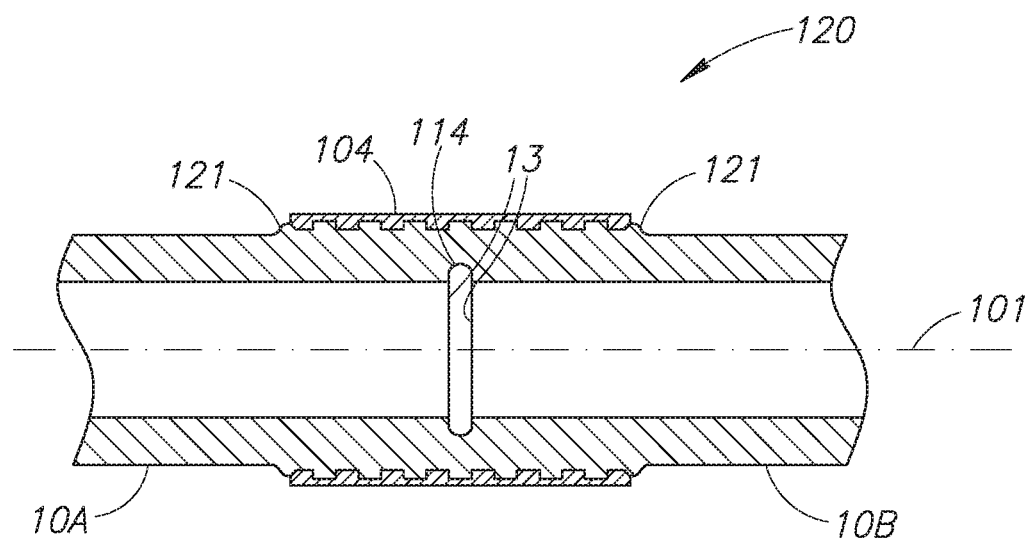
FIG. 6 corresponds to WO 2012/137197 FIG. 6 and is a longitudinal cross section along line B-B in FIG. 5.

Electromagnetic induction welding of the induction weldable pipe connector 100 and the two thermoplastic pipes 10 is now described with reference to FIG. 5 and FIG. 6: The pipe ends 11 are forcibly inserted into the opposite pipe sockets 102 to preload same. The annular pipe end faces 13 abut on opposite sides against the central inwardly directed stop 114.

An electromagnetic induction coil (not shown) is placed over the newly formed assemblage and radio frequency electric current is fed to the electromagnetic induction coil. The electromagnetic induction coil generates an electromagnetic field which induces the susceptor sleeve 104 to absorb electromagnetic energy. The susceptor sleeve 104 heats up and concurrently heats the solder lining 103. The solder lining 103 begins to melt as do the peripheral external pipe end surfaces 12 such that the induction weldable pipe connector 100 and the pipe ends 11 together form a welded sealed joint 120. The solder lining 103 also expands as it melts as evidenced by melted thermoplastic material from the solder lining 103 exuding beyond the susceptor sleeve end faces 112 to form annular thermoplastic extrusions 121 on either side of the welded sealed joint 120.

Figure 7:
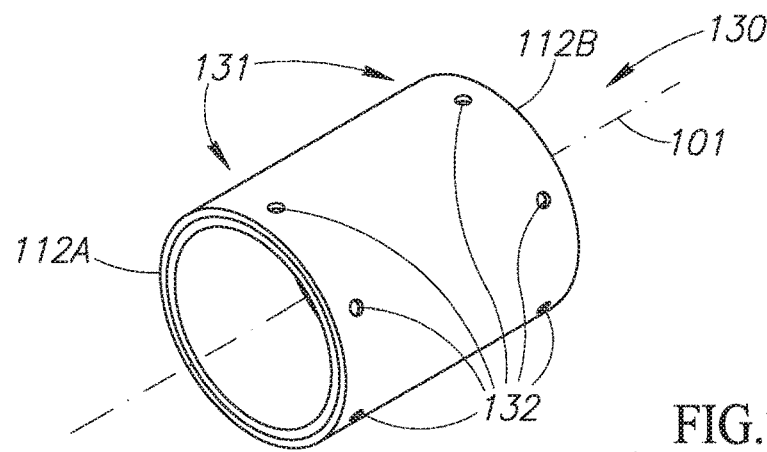
FIG. 7 corresponds to WO 2012/137197 FIG.7.
Figure 8:
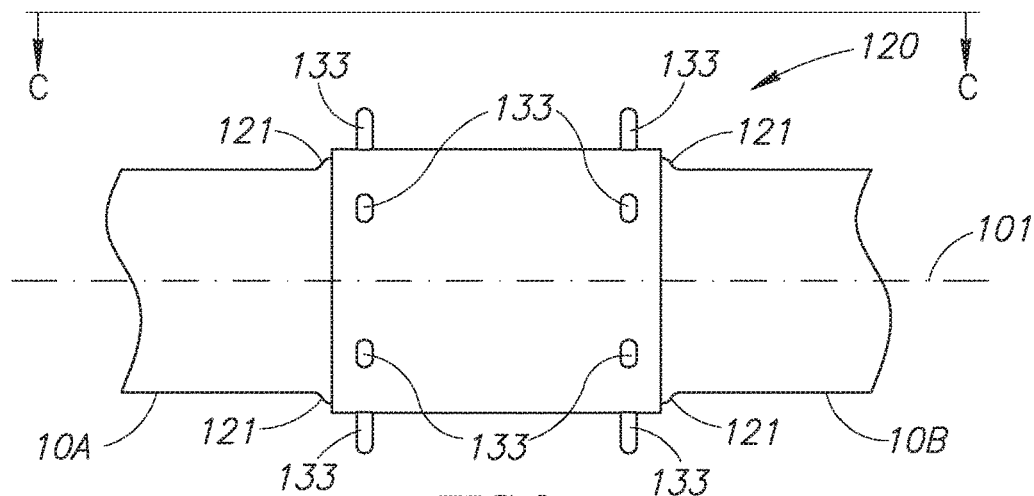
FIG. 8 corresponds to WO 2012/137197 FIG. 8.
Figure 9:
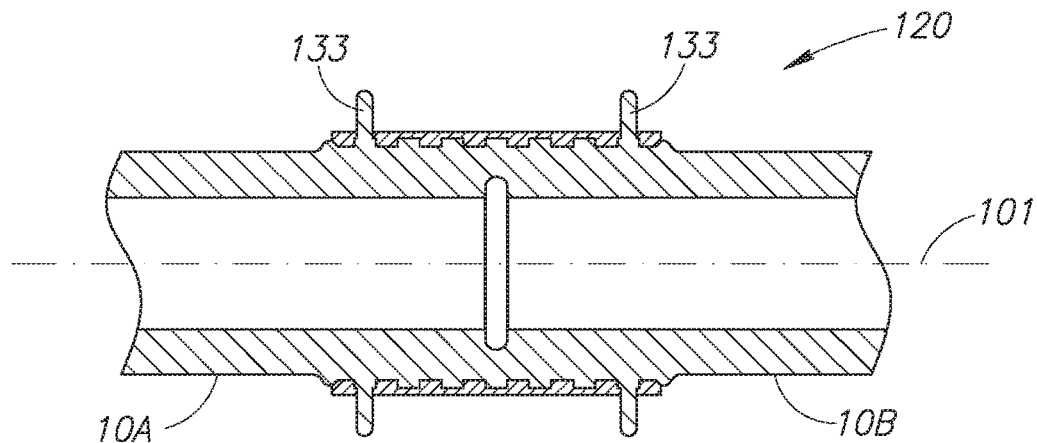
FIG. 9 corresponds to WO 2012/137197 FIG. 9 and is a longitudinal cross section along line C-C in FIG. 8.

FIG. 7 shows an induction weldable pipe connector 130 similar to the induction weldable pipe connector 100 and therefore similar parts are likewise numbered. The former 130 differs from the latter 100 insofar the former 130 includes a susceptor sleeve 104 having a series 131 of radial small diameter inspection apertures 132 slightly inwards of its left susceptor sleeve end surface 112A and a series 131 of radial small diameter inspection apertures 132 slightly inwards of its right susceptor sleeve end surface 112B. FIG. 8 and FIG. 9 show the welded sealed joint 120 including the annular thermoplastic extrusions 121 and additionally outward radial protrusions 133 formed from the solder lining 103 protruding through the inspection apertures 132.

WO 2012/137197 page 3 lines 16 to 18 discloses that induction weldable pipe sockets can include a plastic covering enveloping its susceptor sleeve such that a susceptor sleeve is embedded between a plastic covering and a plastic solder lining.

Section 2: Commonly Owned WO 2015/132783 A2
Entitled Electromagnetic Induction Welding of
Fluid Distribution Systems FIG. 10 to FIG. 16 show a T-shaped installation fitting 300 for connecting three same diameter multilayer pipes 20 requiring the use of either WO 2012/137197 induction weldable pipe connectors 100 or WO 2015/132783 induction weldable pipe connectors 140. The multilayer pipes 20 have a triple layer construction including an external plastic layer 21, an aluminum core layer 22 and an internal plastic layer 23. The multilayer pipe 20 has the same external pipe diameter D1 as the plastic pipe 10 and an internal pipe diameter D4. The multilayer pipe 20 includes a pipe end 24 and an exposed annular pipe end face 26 with an annular aluminum core end face 27 which is prone to oxidation. The multilayer pipes 20 are equivalent to the plastic pipes 10 in terms of induction welding insofar as they include the external plastic layer 21.

The T-shaped installation fitting 300 includes a housing 301 having three tubular plastic pipe ends 302. Each pipe end 302 has a pipe end centerline 303 and an exposed external peripheral plastic surface 304 co-directional with the pipe end centerline 303. The pipe end 302 has a shoulder 306 converging to a tubular pipe tang 307. The pipe tang 307 is provided with two O rings 308. The pipe end 302 preferably tapers to the pipe tang 307 such that the shoulder 306 subtends an included acute angle α with the pipe end centerline 303 in FIG. 12's front elevation view. The included acute angle α is preferably within the range of 45°±10°. Alternatively, the shoulder 306 can form a right angle with the pipe tang 307 such that the exposed external peripheral plastic surface 304 has a stepped configuration. The pipe end 302 includes a full insertion indicator 309 for providing a visual user indication that a pipe end 302 has been fully inserted into an injection weldable pipe connector when the full insertion indicator 309 is adjacent thereto.

The pipe end 302 is shaped and dimensioned for forced sliding insertion into an induction weldable pipe socket 102 similar to a pipe end 24. The pipe tang 307 is shaped and dimensioned for forced sliding insertion into a multilayer pipe 20 such that its O rings 308 sealing contact with the internal plastic surface 23. Accordingly, the pipe end 302 has an external pipe diameter D1 similar to the multilayer pipe 20 and the pipe tang 307 has an external diameter D5 substantially the same as the internal diameter of the multilayer pipe 20 and an internal diameter smaller than the multilayer pipe 20.

FIG. 13 and FIG. 14 show a WO 2015/132783 induction weldable pipe connector 140 differing from a WO 2012/137197 induction weldable pipe connector 100 insofar as it includes a major central pipe connector section 141 and a minor lateral pipe connector section pair 142 respectively at the induction weldable pipe socket pair 102. The induction weldable pipe connector 140 has a length L1, the major central pipe connector section 141 has a length L2 and each minor lateral pipe connector section 142 has a length L3 wherein L1=L2+2 L3 and L2>½ L1.

The major central pipe connector section 141 has a thickness T1 and the each minor lateral pipe connector section 142 has a thickness T2 wherein T2<T1. Each minor lateral pipe connector section 142 is of reduced thickness compared to the major central connector section 141 such that they absorb less induction energy than the major central pipe connector section 141 per unit length, thereby ensuring the major central pipe connector section 141 is induction heated to a higher temperature than the minor lateral pipe connector section pair 142. Typically T2≈½ T1. The minor lateral pipe connector section pair 142 is preferably formed with the radial small diameter apertures 132.

Figure 15:
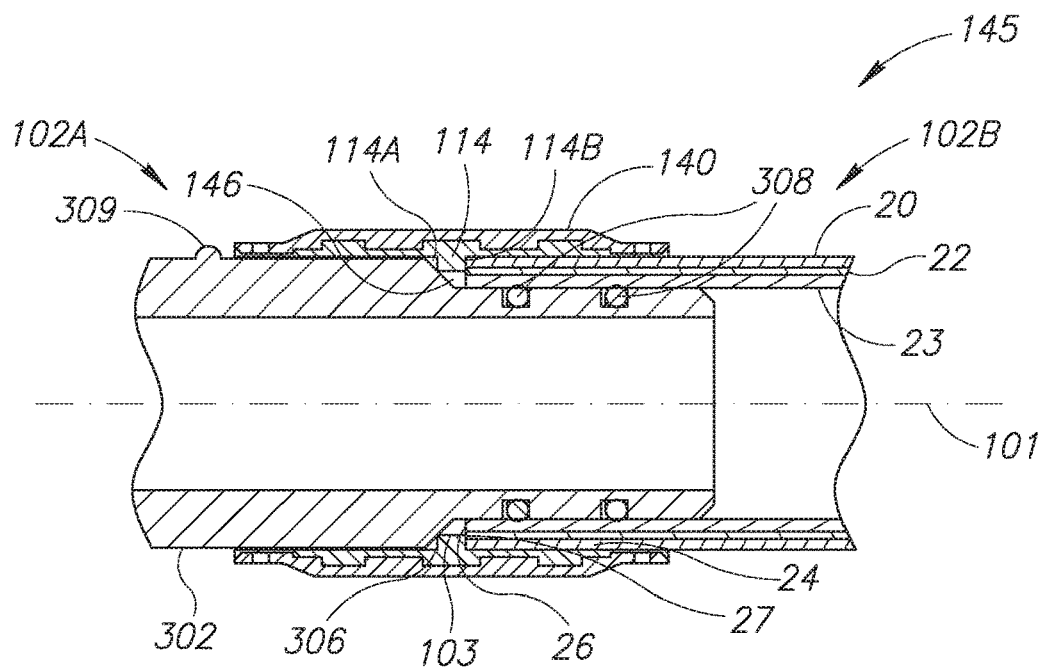
FIG. 15 corresponds to WO 2015/132783 FIG. 17.
Figure 16:
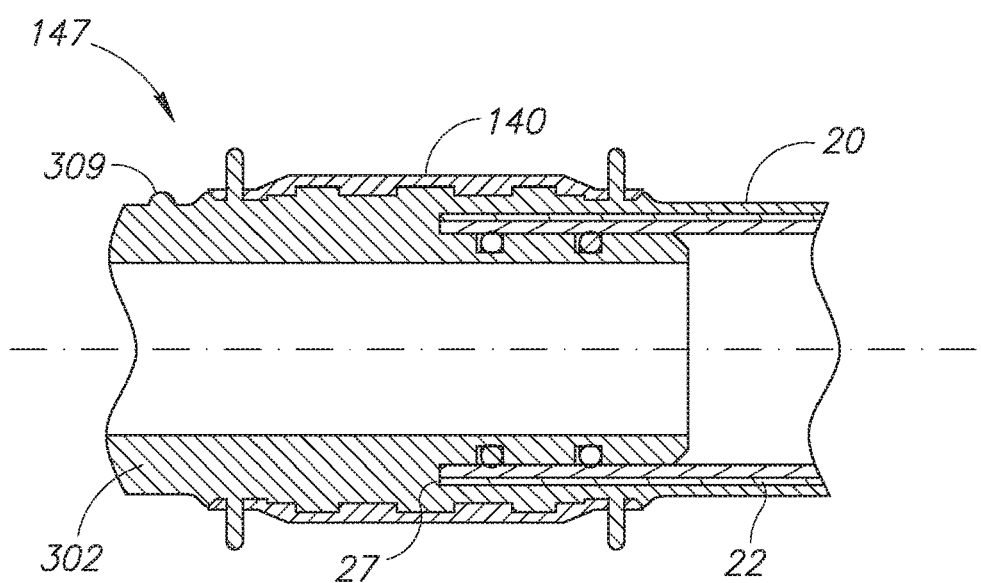
FIG. 16 corresponds to WO 2015/132783 FIG. 18.

FIG. 15 shows a pre-welded joint 145 of the pipe end 302, the induction weldable pipe connector 140 and the multilayer pipe 20. FIG. 16 shows a welded sealed joint 147 subsequent to application of induction energy to the pre-welded joint 145 in a similar manner as explained in aforesaid WO 2012/137197.

Figure 17:
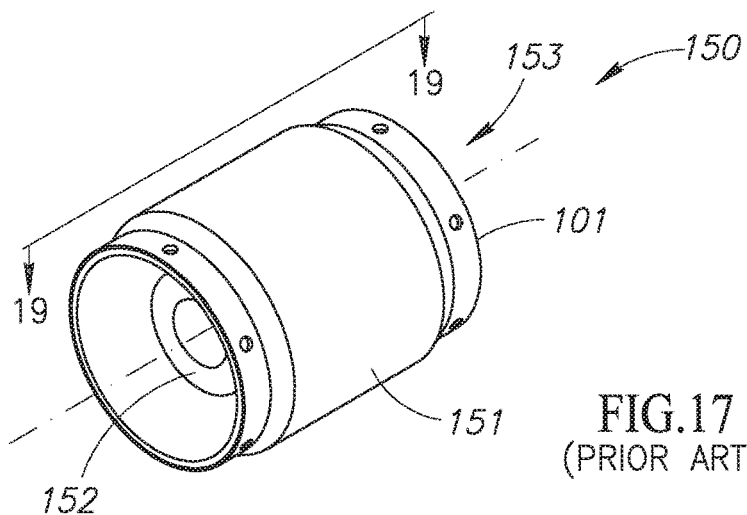
FIG. 17 corresponds to WO 2015/132783 FIG. 19.
Figure 18:
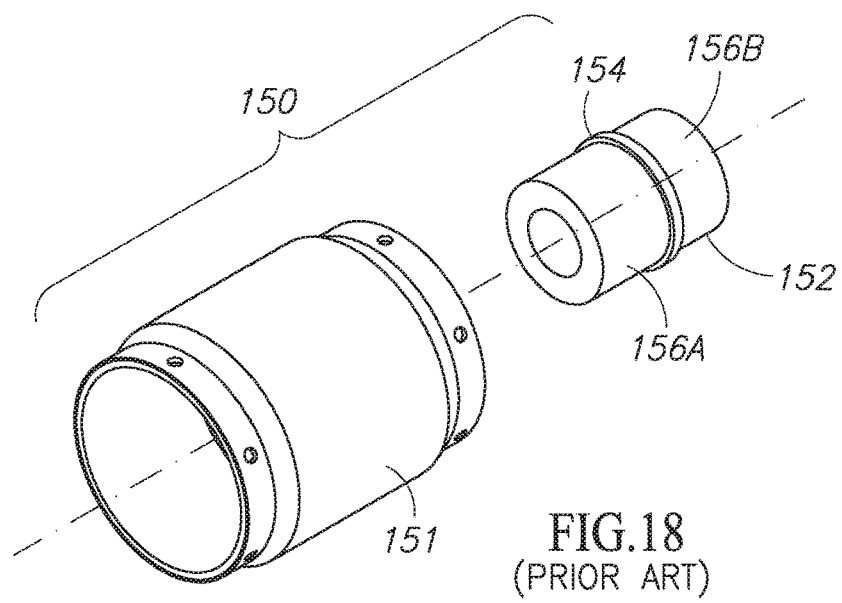
FIG. 18 corresponds to WO 2015/132783 FIG. 20.
Figure 19:
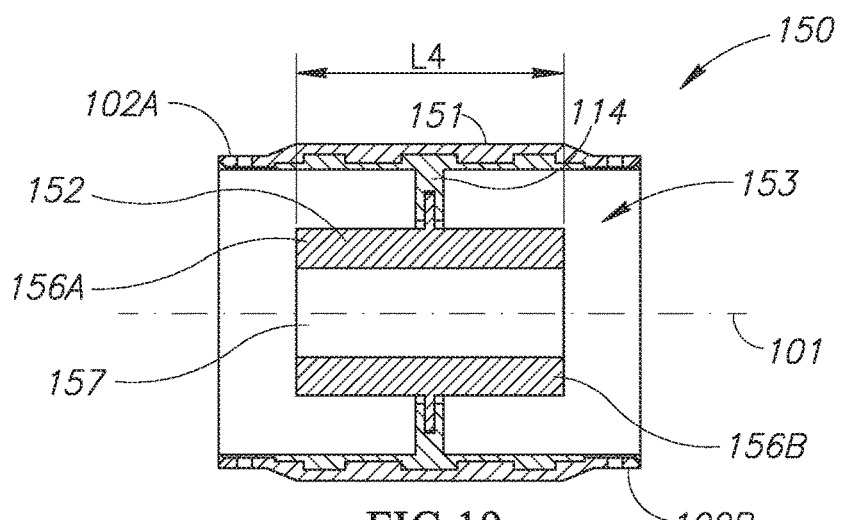
FIG. 19 corresponds to WO 2015/132783 FIG. 21.

FIG. 17 to FIG. 19 show a WO 2015/132783 so-called assisted induction weldable pipe connector with integral solder flow barrier 150 modified from the WO 2015/132783 induction weldable pipe connector 140. The assisted induction weldable pipe connector 150 includes an induction weldable pipe connector 151, a solder flow barrier 152 and a mounting arrangement 153 for mounting the solder flow barrier 152 inside the induction weldable pipe connector 151. The solder flow barrier 152 includes a central flange 154 employed by the mounting arrangement 153. Suitable mounting arrangements 153 include inter alia a mechanical arrangement, gluing, and the like. The solder flow barrier 152 is preferably formed from a dissolvable material for initially assisting an induction welding operation of two multi-layer pipes 20 before being dissolved pursuant to fluid flowing therethrough.

The assisted induction weldable pipe connector 150 has the same length L1 as the induction weldable pipe connector 140 and the solder flow barrier 152 has a length L4 wherein L4<L1. Typically L4≈½ L1. The solder flow barrier 152 includes a pipe tang pair 156 corresponding with the induction weldable pipe socket pair 102. The pipe tang pair 156 has an external diameter D5 similar to the pipe tangs 307 for the same purpose of sealing against the internal plastic layer 23. The solder flow barrier 152 preferably includes a throughgoing bore 157 co-directional with the longitudinal pipe connector axis 101.

Figure 20A:
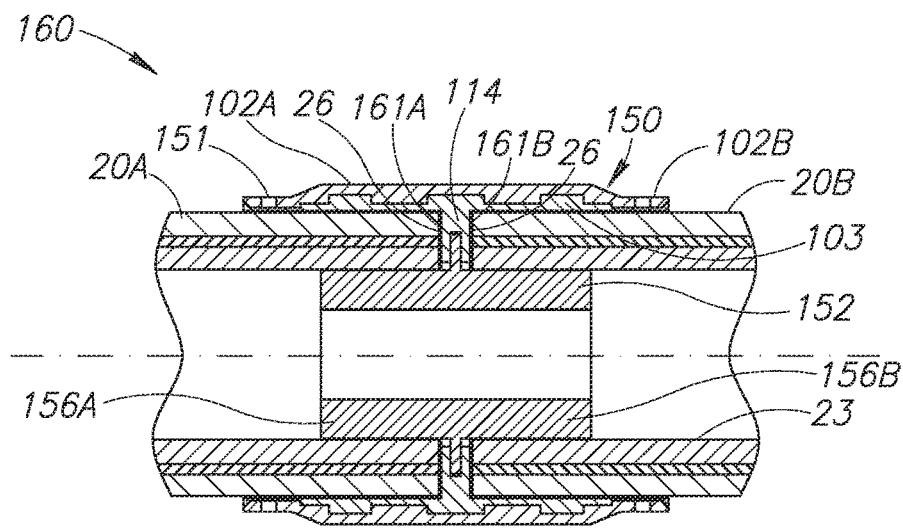
FIG. 20A corresponds to WO 2015/132783 FIG. 22A.
Figure 20B:
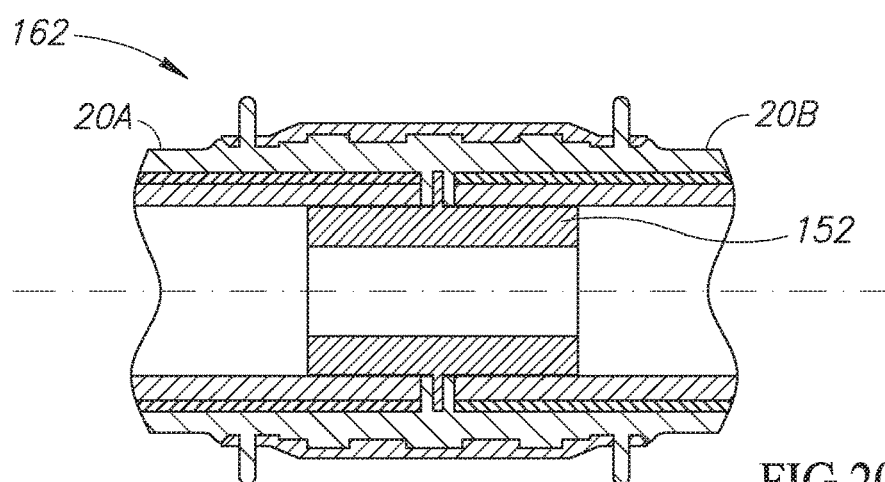
FIG. 20B corresponds to WO 2015/132783 FIG. 22B.
Figure 20C:
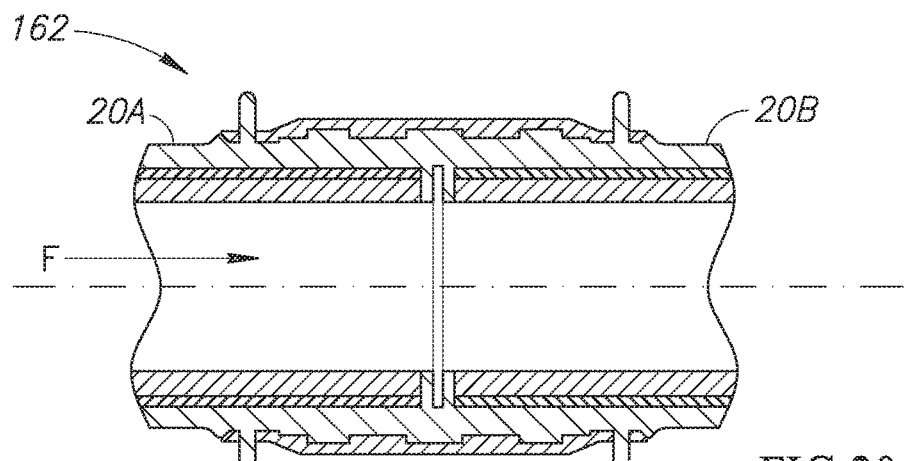
FIG. 20C corresponds to WO 2015/132783 FIG. 22C.

FIG. 20A to FIG. 20C show the use of the assisted induction weldable pipe connector 150 for end to end induction welding two multi-layer pipes 20.

FIG. 20A shows a pre-welded joint 160 of the assisted induction weldable pipe connector 150 and the multi-layer pipes 20 on forced sliding insertion of the multi-layer pipes 20 into opposite induction weldable pipe sockets 102 until abutment of their respective exposed annular pipe end faces 26 against the central inwardly directed stop 114. The pipe tang pair 156 is slidingly inserted into the pipe ends 24. The annular pipe end faces 26 and the assisted induction weldable pipe connector 150 form annular contact zones 161A and 161B externally bound by the internal thermoplastic solder lining 103 and internally bound by the solder flow barrier 152.

FIG. 20B shows a welded sealed joint 162 subsequent to application of induction energy to the pre-welded joint 160 in a similar manner as explained in aforesaid WO 2012/137197. The internal thermoplastic soldering lining 103 melts and expands to flow radially inwards towards the solder flow barrier 152 and also peripherally along the pipe end 302 and the multi-layer pipe 20 to form annular thermoplastic extrusions 121.

FIG. 20C shows the welded sealed joint 162 after the solder flow barrier 152 has been dissolved by fluid F flowing through the multi-layer pipes 20.

Figure 21:
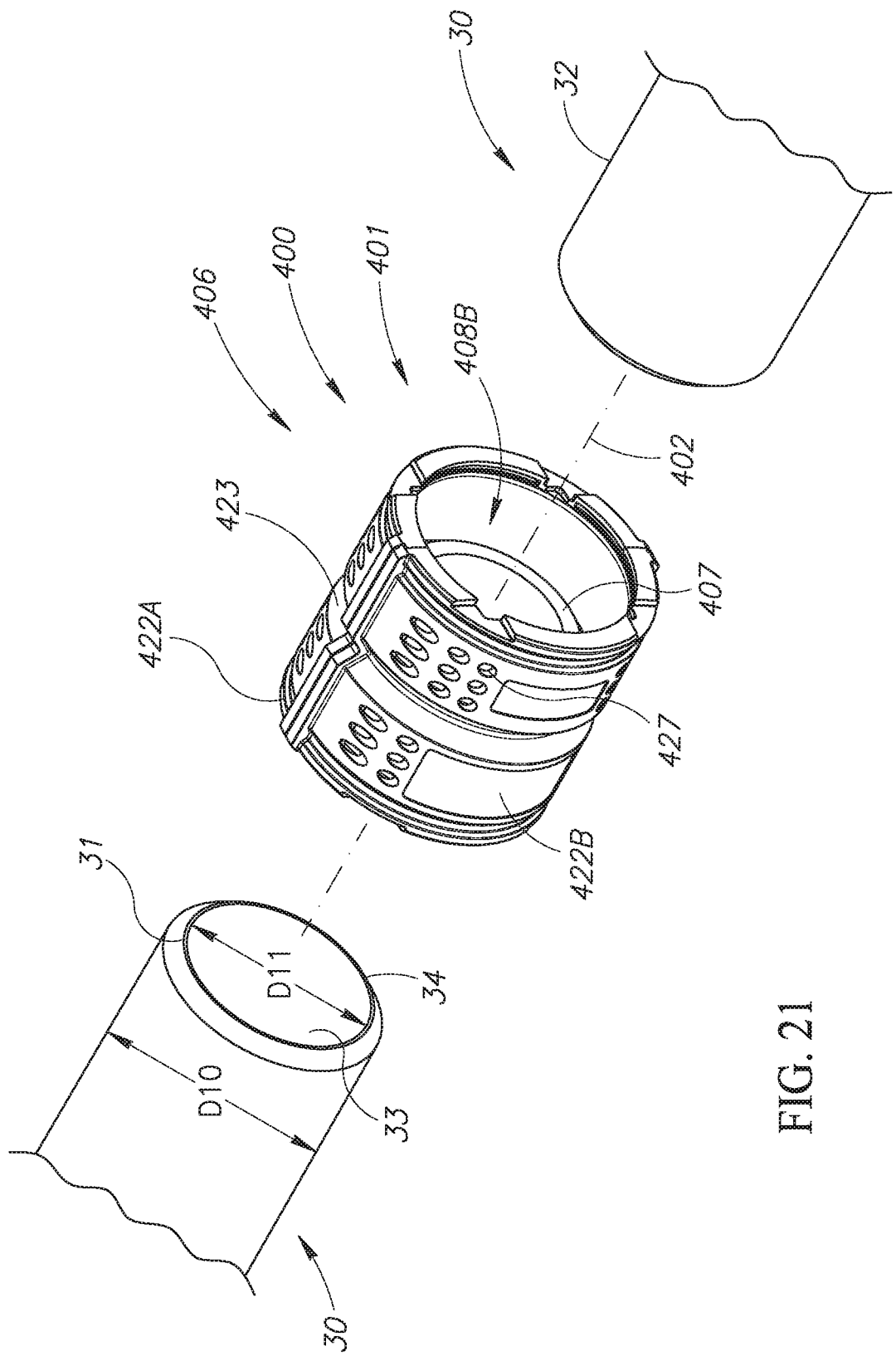
FIG. 21 is a perspective view of a first embodiment of an induction weldable pipe connector with an opposite pair of induction weldable pipe sockets for end-to-end welding two same diameter plastic pipes into a welded sealed joint.
Figure 22:
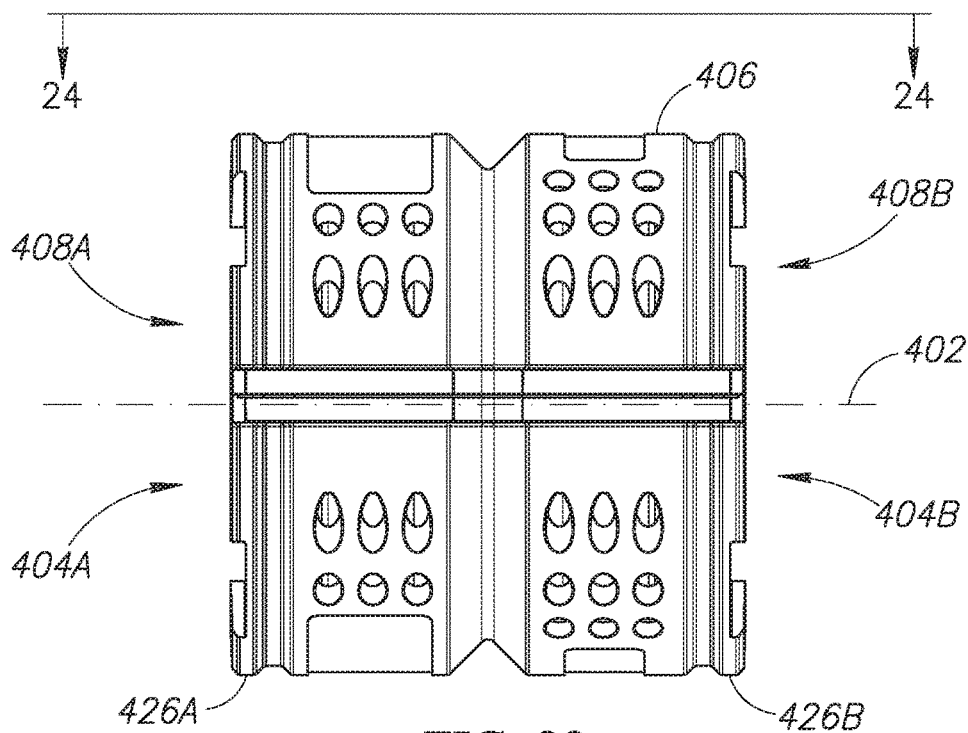
FIG. 22 is a front elevation view of the FIG. 21 induction weldable pipe connector.
Figure 23:
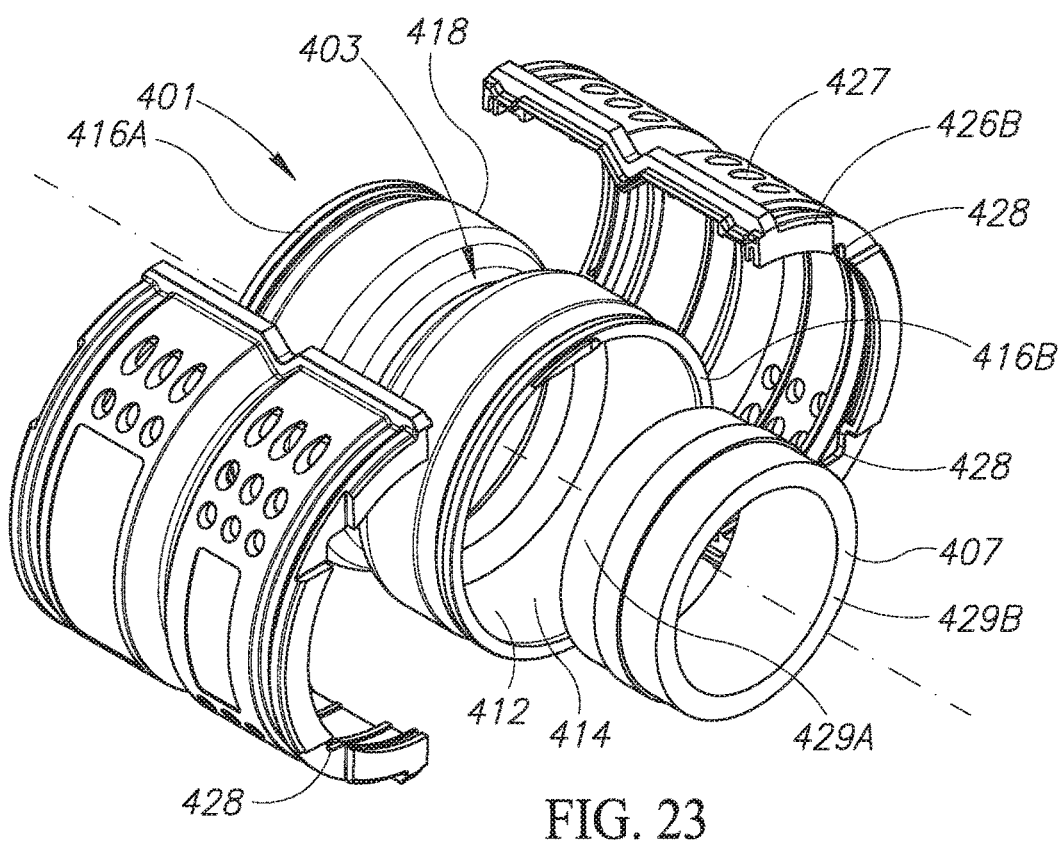
FIG. 23 is an exploded view of the FIG. 21 induction weldable pipe connector.
Figure 24:
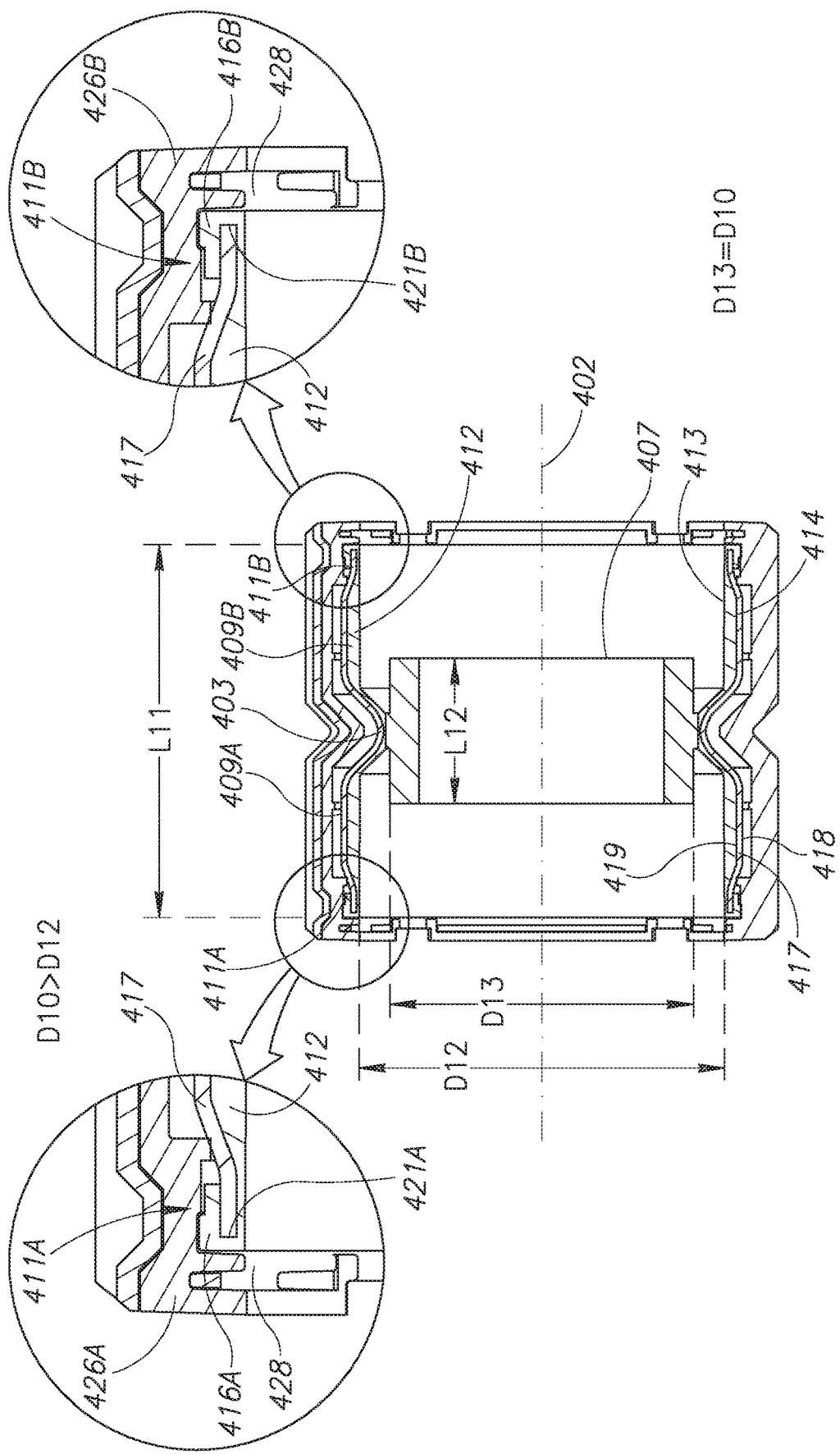
FIG. 24 is a longitudinal cross section of the FIG. 21 induction weldable pipe connector along line 24-24 in FIG. 22.

Section 3: Induction Weldable Pipe Connector Having Thermally Insulated Induction Weldable Socket Mouth Rims FIG. 21 shows an induction weldable pipe connector 400 for end-to-end welding a plastic pipe pair of same diameter plastic pipes 30. The plastic pipes 30 each have a beveled pipe end 31, an external peripheral pipe surface 32 with an external pipe diameter D10, an internal peripheral pipe surface 33 with an internal pipe diameter D11, and an annular pipe end face 34. The external pipe diameter D10 is typically in the range of from 10 mm to 90 mm. The plastic pipes 30 can be fabricated from a single plastic material or alternatively have a multilayer composition.

FIG. 21 to FIG. 24 show the induction weldable pipe connector 400 includes a three component construction as follows: First, a tubular induction weldable mounting 401 having an induction weldable mounting centerline 402 and a central narrow waist 403 dividing the induction weldable mounting 401 into an opposite pair of induction weldable sockets 404A and 404B. Second, a tubular cover 406 peripherally mounted on the induction weldable mounting 401. And third, a tubular dual ended pipe tang 407 mounted inside the induction weldable mounting 401 for destining the induction weldable sockets 404A and 404B as induction weldable pipe sockets 408A and 408B dimensioned for forced sliding insertion of the beveled pipe ends 31 thereinto. The dual ended pipe tang 407 acts as a WO 2015/132783 solder flow barrier.

The induction weldable mounting 401 includes an opposite pair of major sections 409A and 409B lateral to the central narrow waist 403 and an opposite pair of minor sections 411A and 411B correspondingly lateral to the opposite pair of major sections 409A and 409B. The opposite pair of major sections 409 have a greater thickness in a radial direction to the induction weldable mounting centerline 402 than the opposite pair of minor sections 411. The central narrow waist 403 is designed for snugly receiving the beveled pipe ends 31 on their sliding insertion into the induction weldable pipe sockets 408A and 408B. The induction weldable mounting 401 has an overall length L11.

The induction weldable mounting 401 includes a thermoplastic solder lining 412 having an internal solder lining surface 413, an external solder lining surface 414 and an opposite pair of annular solder lining rims 416A and 416B. The thermoplastic solder lining 412 is made from suitable material capable of welding to the plastic pipes 30. The internal solder lining surface 413 has an internal solder lining surface diameter D12 wherein D12 is slightly narrower than the external pipe diameter D10 thereby requiring forced sliding insertion of the beveled pipe ends 31 into the induction weldable pipe sockets 408A and 408B.

The induction weldable mounting 401 also includes a solid ferromagnetic metal susceptor sleeve 417 having an external susceptor sleeve surface 418, an internal susceptor sleeve surface 419 and an opposite pair of annular susceptor sleeve end faces 421A and 421B. The internal susceptor sleeve surface 419 is in intimate contact with the external solder lining surface 414 for transferring heat thereto during an electromagnetic induction welding operation. The susceptor sleeve 417 preferably has a uniform thickness therealong such that the solder lining 412 is thicker at the opposite pair of major sections 409 than at the opposite pair of minor sections 411.

The susceptor sleeve 417 entirely peripherally envelopes the solder lining 412. The solder lining 412 extends beyond the susceptor sleeve 417 along the induction weldable mounting centerline 402 such that the opposite pair of annular solder lining rims 416A and 416B are correspondingly lateral to the opposite pair of annular susceptor sleeve end faces 421A and 421B. The opposite pair of annular solder lining rims 416A and 416B extend radially outward with respect to the induction weldable mounting centerline 402 for covering the opposite pair of annular susceptor sleeve end faces 421A and 421B. The opposite pair of annular solder lining rims 416A and 416B wraparound the opposite pair of annular susceptor sleeve end faces 421A and 421B for entrapping them therewithin. The opposite pair of annular solder lining rims 416A and 416B leave a major part of the external susceptor sleeve surface 418 therebetween exposed.

The cover 406 includes two semi-cylindrical cover halves 422A and 422B and a central narrow cover waist 423 aligned with the induction weldable mounting's central narrow waist 403. The cover 406 is typically made of suitable plastic material, for example, PA 66, and the like. The cover 406 has an external peripheral cover surface 424 and an opposite pair of annular induction weldable socket mouth rims 426A and 426B lateral to the opposite pair of annular solder lining rims 416A and 416B.

The opposite pair of annular induction weldable socket mouth rims 426A and 426B are thermally insulated from the opposite pair of susceptor sleeve end faces 421A and 421B by the opposite pair of annular solder lining rims 416A and 416B, thereby effectively forming unheated zones. The annular thermally insulated induction weldable socket mouth rims 426A and 426B are equivalent to the so-called L3 nominal unheated entrance length of fitting (distance between the mouth of the fitting and the start of the fusion zone as declared by the manufacturer) as set out in International Standard ISO 22391-3 Plastic piping systems for hot and cold water installations—Polyethylene of raised temperature resistance (PE-RT)—Part 3: Fittings page 9 FIG. 2. The annular induction weldable socket mouth rims 426A and 426B have an internal diameter such that they seal against the plastic pipe pair 30 on their forced sliding insertion into the induction weldable pipe sockets 408A and 408B.

The cover 406 is spaced apart from the induction weldable mounting 401 thereby providing air insulation therebetween for insulating the cover 406 from heat being generated in the induction weldable mounting 401 during an electromagnetic induction welding operation. The cover surface 424 includes ventilation holes 427 conforming to UL finger probe requirements for preventing user contact with the susceptor sleeve 417. The annular induction weldable socket mouth rims 426A and 426B each include four equispaced indication apertures 428 therearound for enabling melted solder lining 412 to exude therethrough during an ongoing electromagnetic induction welding operation.

The dual ended pipe tang 407 is mounted on the central narrow waist 403 by suitable manufacturing techniques. The dual ended pipe tang 407 includes an opposite pair of pipe tangs 429A and 429B correspondingly deployed in the opposite pair of induction weldable pipe sockets 408A and 408B such that the dual ended pipe tang 407 acts as a solder flow barrier. The pipe tangs 429A and 429B have an external pipe tang diameter D13 similar to the internal pipe diameter D1/ for sealing against the internal peripheral pipe surfaces 33. The dual ended pipe tang 407 is made from suitable plastic material having a higher melting temperature than the solder lining 412. The dual ended pipe tang 407 has an overall pipe tang length L13 where L13 is approximately 1/2 L11.

Figure 25:
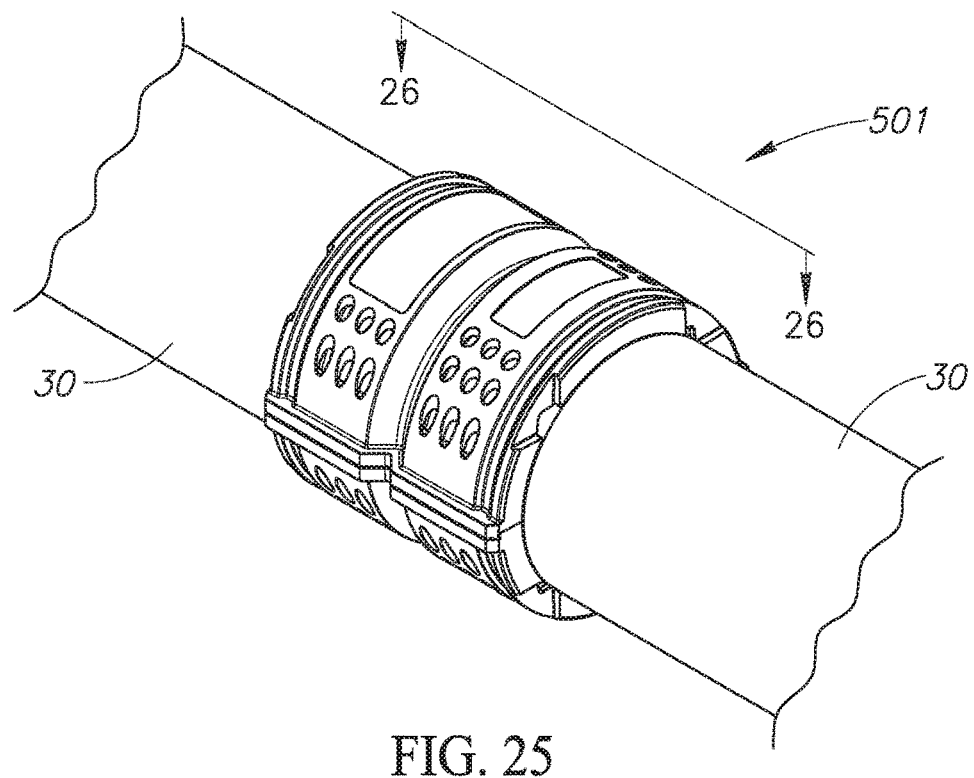
FIG. 25 is a front perspective view of a pre-welded joint of the FIG. 21 induction weldable pipe connector and the plastic pipe pair inserted into the opposite pair of induction weldable pipe sockets.
Figure 26:
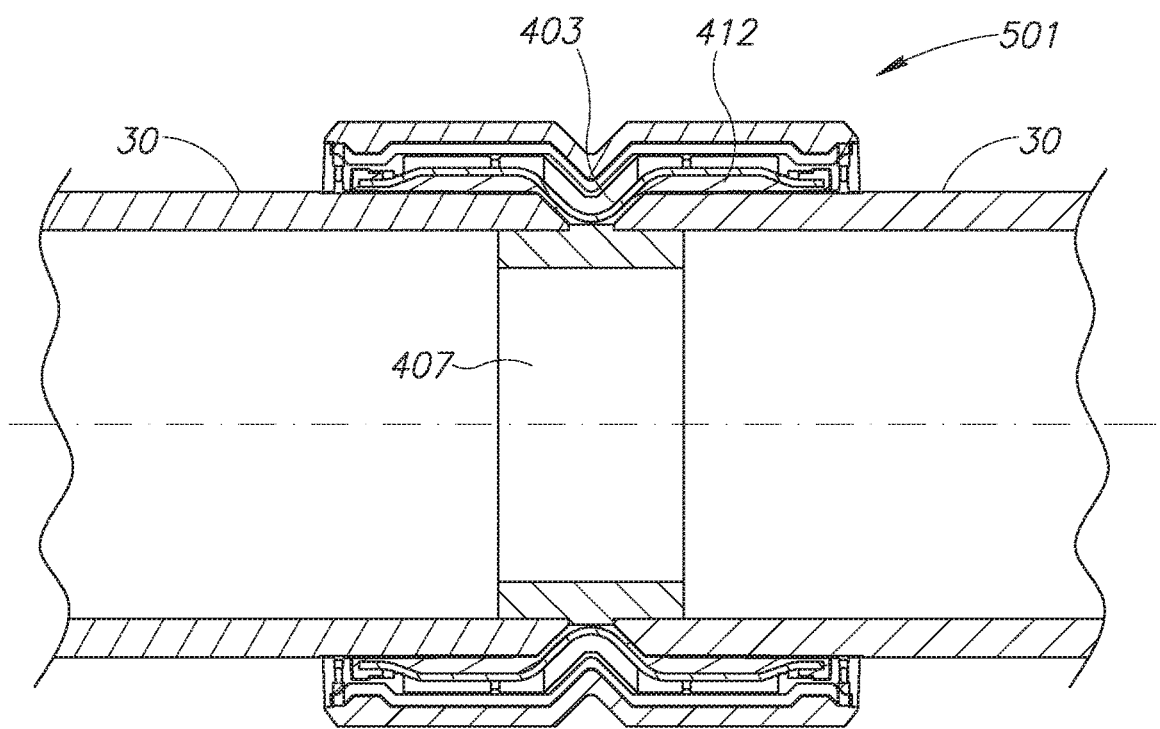
FIG. 26 is a longitudinal cross section of the FIG. 25 pre-welded joint along line 26-26 in FIG. 25.
Figure 27:
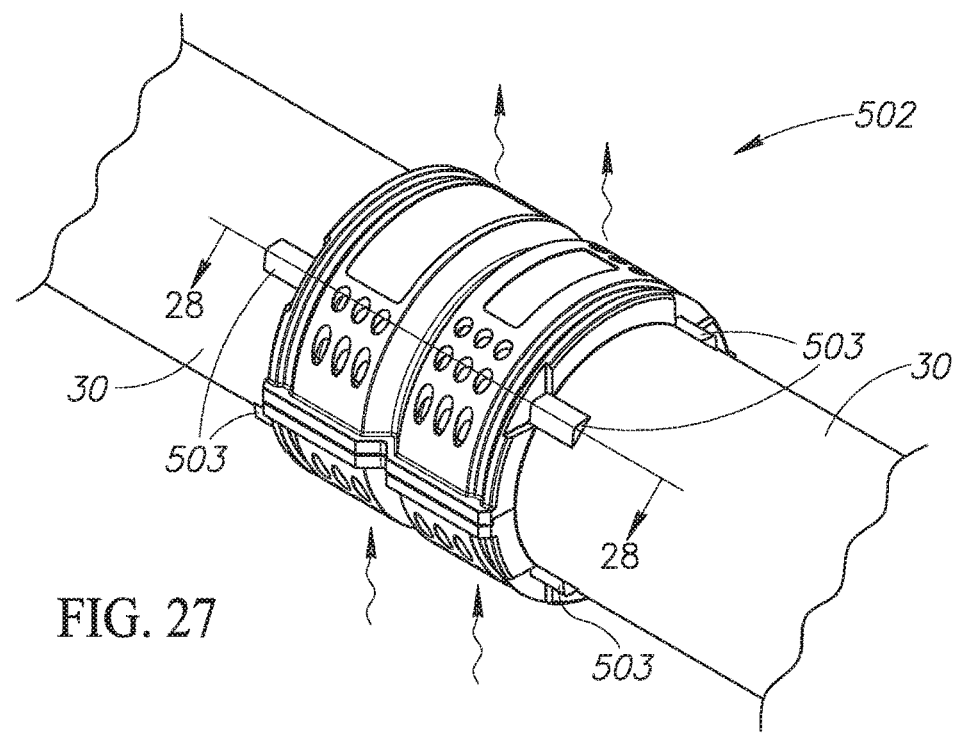
FIG. 27 is a front perspective view of a welded sealed joint of the FIG. 21 induction weldable pipe connector and the plastic pipe pair.
Figure 28:
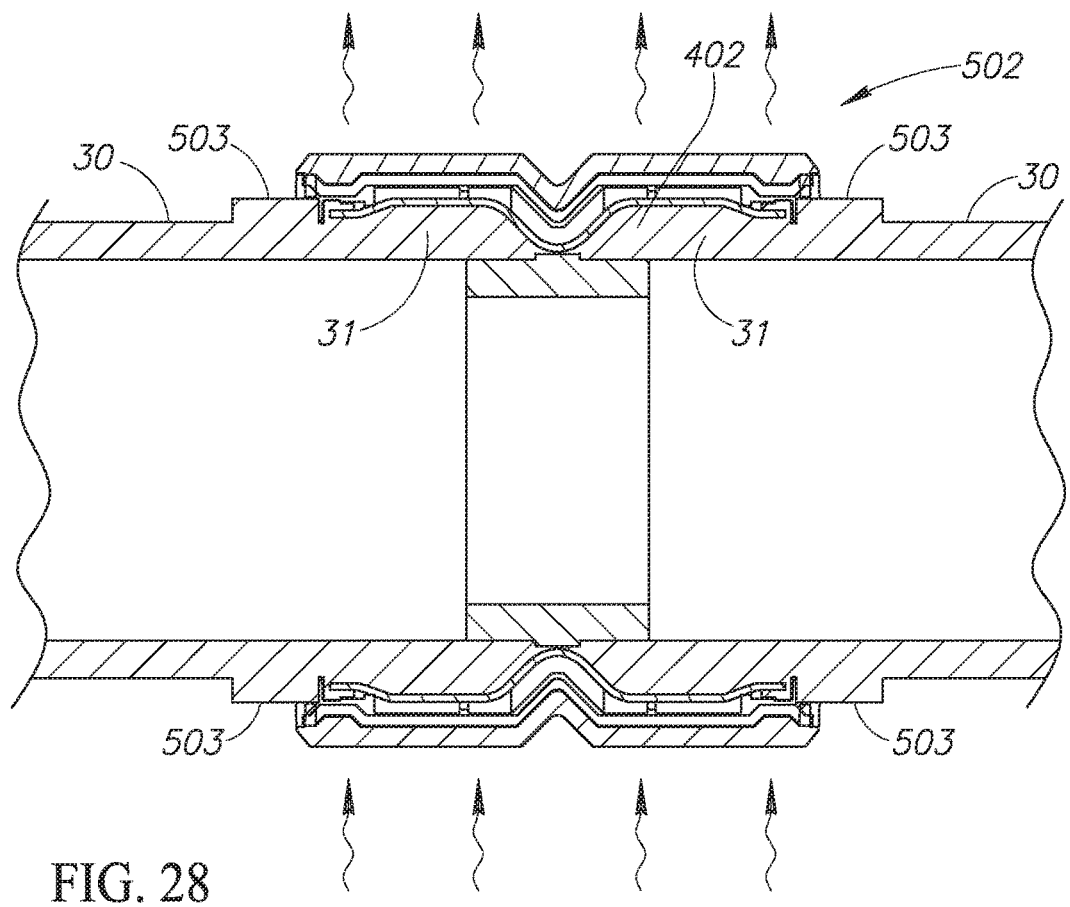
FIG. 28 is a longitudinal cross section of the FIG. 27 welded sealed joint along line 28-28 in FIG. 27.

FIG. 25 and FIG. 26 show a pre-welded joint 501 of the induction weldable pipe connector 400 and plastic pipe pair 30. On application of electromagnetic induction energy to the induction weldable pipe connector 400, the solder lining begins to melt and expand. The melted solder lining 412 is entrapped by the susceptor sleeve 417, the thermally insulated induction weldable socket mouth rims 426A and the 426B and the dual ended pipe tang 407 except for small volumes which exude from the equispaced indication apertures 428 to form elongated extrusions 503 along the plastic pipes 30 to indicate progress of the electromagnetic induction welding operation. Such entrapment facilitates strong fusing between the pipe ends 31 and the solder lining 412. FIG. 27 and FIG. 28 show a welded sealed joint 502 pursuant to electromagnetic induction welding of the pre-welded joint 501 as evidenced by the solder lining 412 and the beveled pipe ends 31 being fused together on opposite sides of the induction welding mounting's central narrow waist 403. After interrupting electromagnetic induction energy to the induction welding pipe connector 400, a natural upward flow of ambient air passes through the cover 406 around the welded sealed joint 502 for convection cooling same as denoted by the wavy arrows.

Figure 29:
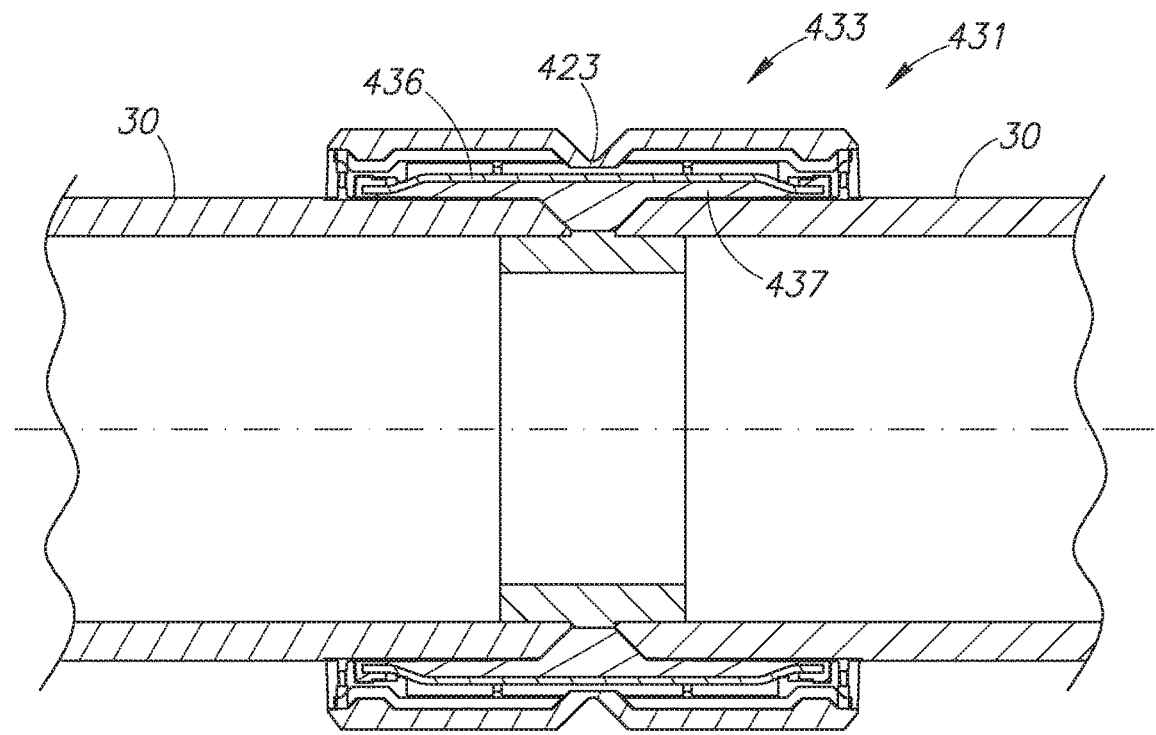
FIG. 29 is a longitudinal cross section of a second embodiment of an induction weldable pipe connector.
Figure 30:
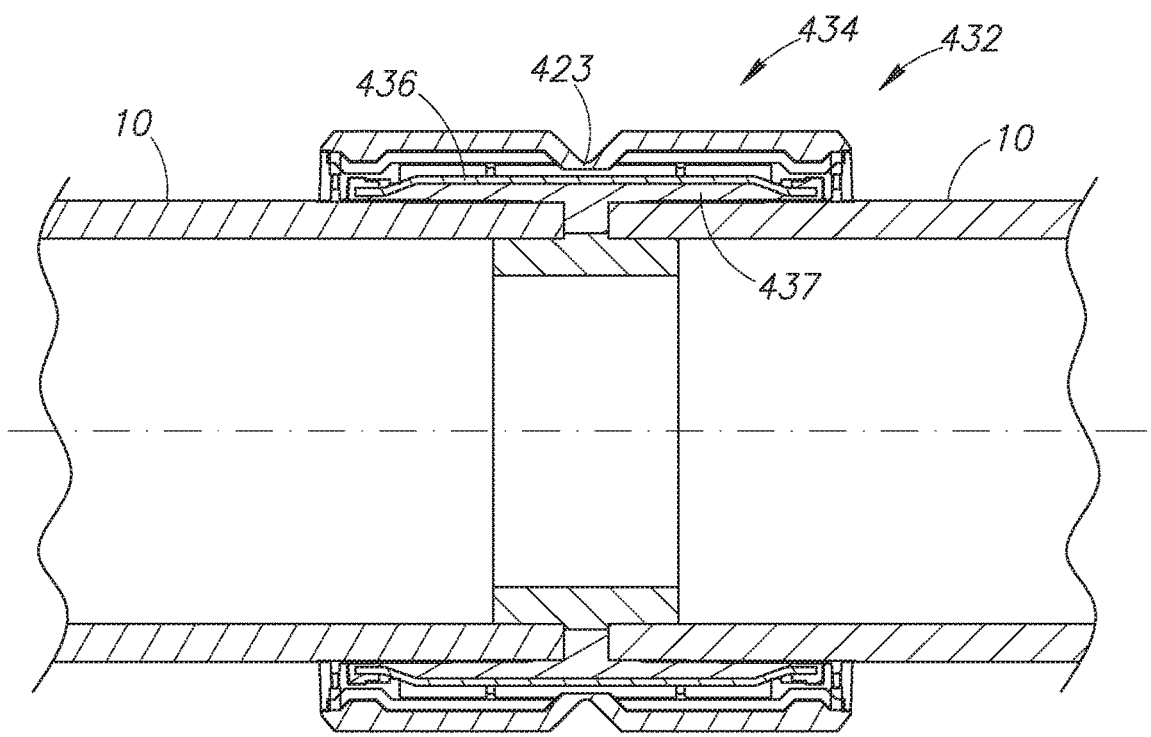
FIG. 30 is a longitudinal cross section of a third embodiment of an induction weldable pipe connector.

FIG. 29 and FIG. 30 show induction weldable pipe connectors 431 and 432 correspondingly intended for use with a beveled plastic pipe 30 and a non-beveled plastic pipe 10. The induction weldable pipe connectors 431 and 432 are similar to the induction weldable pipe connector 400 but differ therefrom insofar as the latter 431 and 432 correspondingly include induction weldable mountings 433 and 434 each having a susceptor sleeve 436 and a solder lining 437 without the induction weldable mounting 401's central narrow waist 403.

Figure 31:
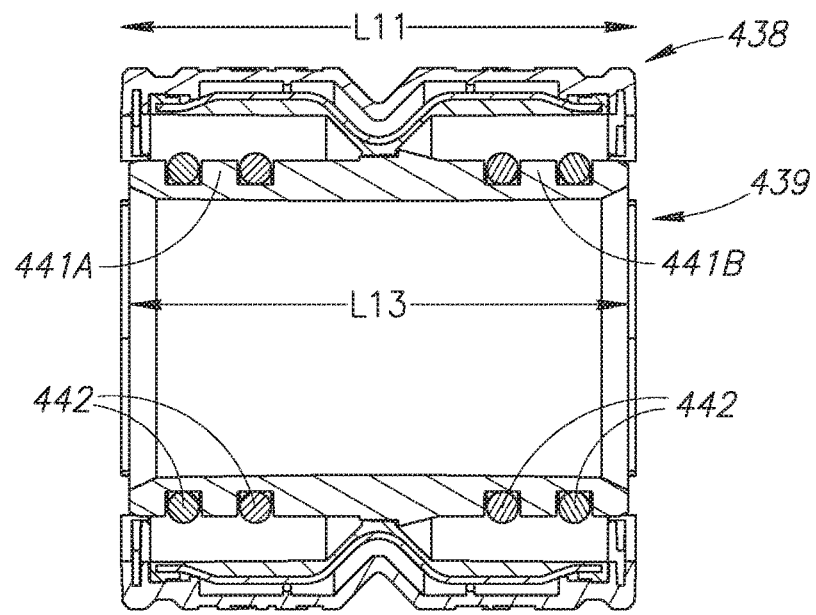
FIG. 31 is a longitudinal cross section of a fourth embodiment of an induction weldable pipe connector.

FIG. 31 shows an induction weldable pipe connector 438 similar to the induction weldable pipe connector 400 but differing therefrom insofar as the latter 438 is intended for use with multi-layer plastic pipes 20 with an aluminum core layer 22. The latter 438 includes a dual ended pipe tang 439 including an opposite pair of pipe tangs 441A and 441B. The dual ended pipe tang 439 has an overall length L13 nearly co-extensive with the induction weldable pipe connector 438's length L11 thereby enabling the opposite pair of pipe tangs 441A and 441B to be each provisioned with a spaced apart pair of O rings 442 for sealing against the multi-layer plastic pipes' internal pipe surfaces.

Figure 32:
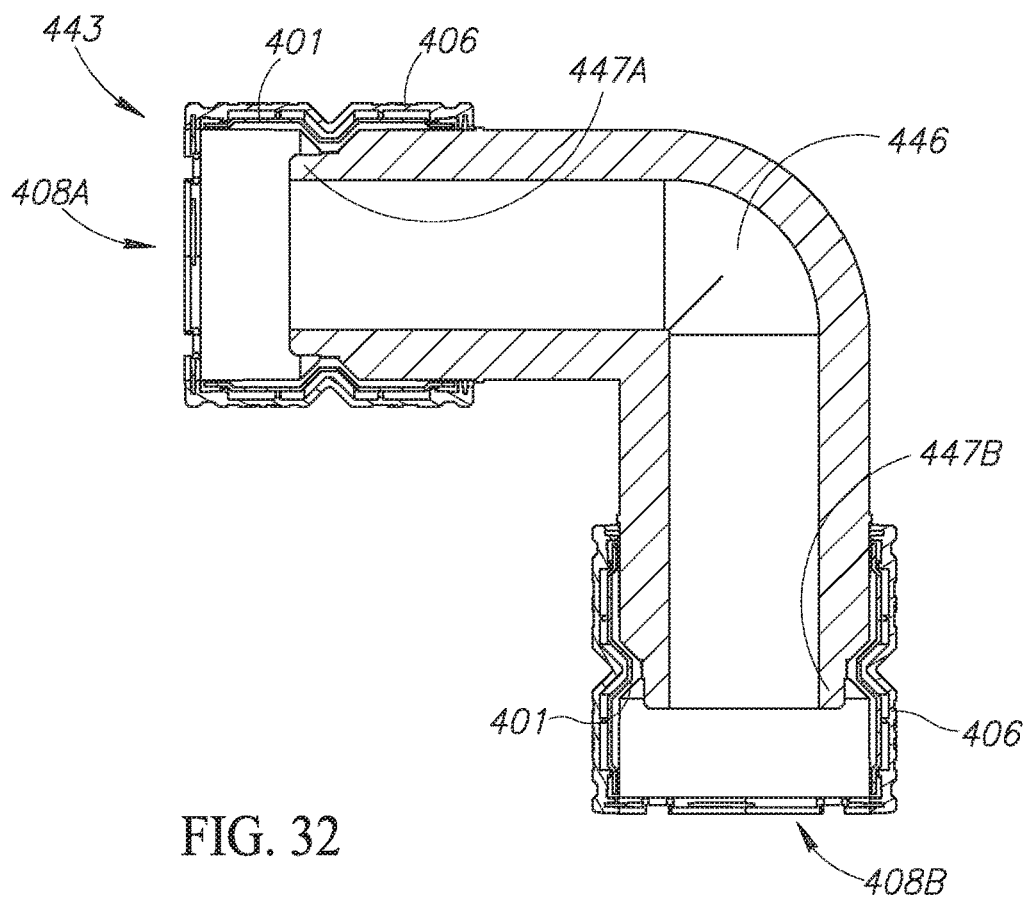
FIG. 32 is a longitudinal cross section of an induction weldable pipe connector in the form of a right angle elbow pipe fitting.
Figure 33:
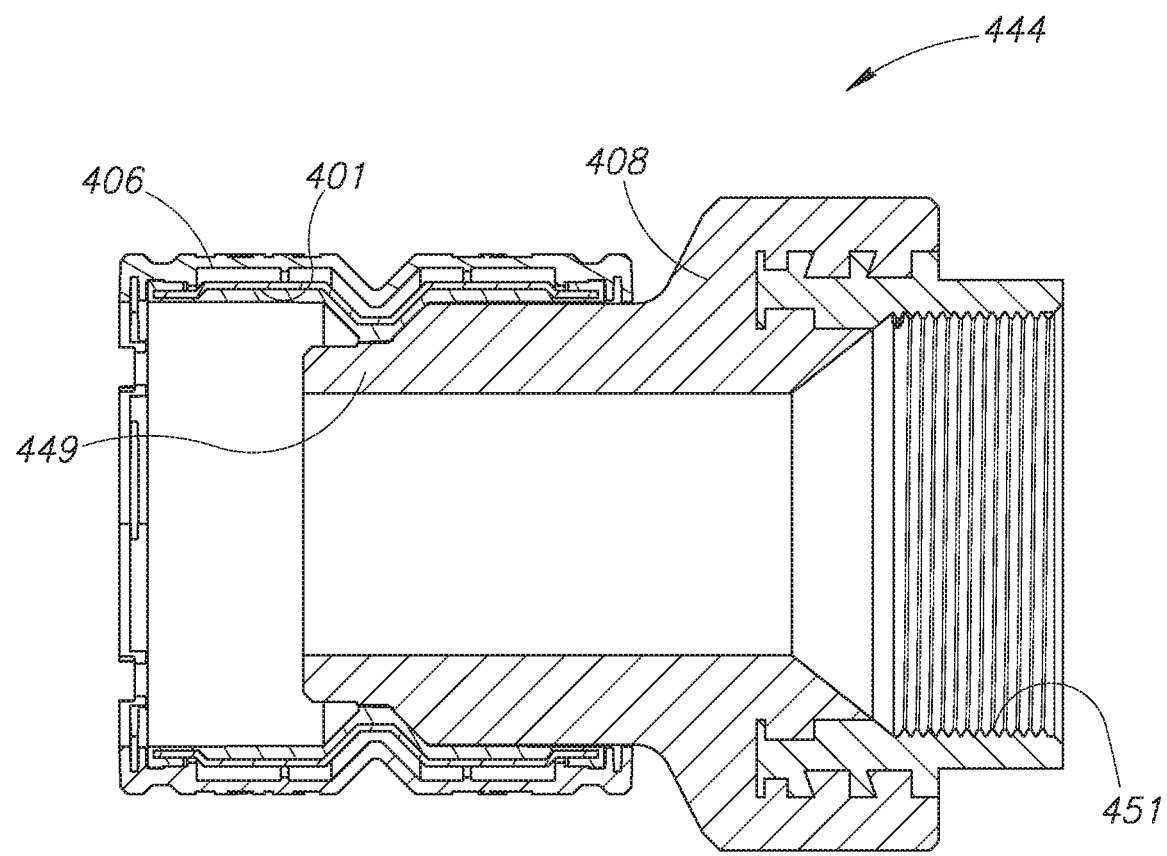
FIG. 33 is a longitudinal cross section of an induction weldable pipe connector in the form of a pipe fitting with an internal screw thread.

FIG. 32 and FIG. 33 shows induction weldable pipe connectors 443 and 444 for other connection purposes than end-to-end pipe connection. The induction weldable pipe connectors 443 and 444 can be modified for use with multi-layer pipes 20 with aluminum core layers 22 in a similar manner as the induction weldable connector 438.

The induction weldable pipe connector 443 is in the form of a right angle elbow pipe fitting having orthogonal disposed induction weldable pipe sockets 408A and 408B. The induction weldable pipe connector 443 includes an L-shaped member 446 terminating at pipe tangs 447A and 447B, induction weldable mountings 401 mounted on the pipe tangs 447A and 447B and covers 406 mounted on the induction weldable mountings 401.

The induction weldable pipe connector 444 includes a tubular member 448 having opposite ends terminating at a pipe tang 449 and an internal screw thread 451. The induction weldable pipe connector 444 includes an induction weldable mounting 401 mounted on the pipe tang 449 and a cover 406 mounted on the induction weldable mounting 401.

While the invention has been described with respect to a limited number of embodiments, it will be appreciated that many variations, modifications, and other applications of the invention can be made within the scope of the appended claims.

The invention claimed is:

1. An induction weldable pipe connector for use with a plastic pipe, the plastic pipe having a pipe end, an external peripheral pipe surface, an internal peripheral pipe surface, and an annular pipe end face, the induction weldable pipe connector comprising:
(a) a tubular induction weldable mounting having an induction weldable mounting centerline and an opposite pair of induction weldable sockets, said induction weldable mounting including:
   i) a thermoplastic solder lining having an external solder lining surface, an internal solder lining surface and an opposite pair of annular solder lining rims, and
   ii) a solid ferromagnetic metal susceptor sleeve entirely peripherally enveloping said solder lining, said susceptor sleeve having an external susceptor sleeve surface, an internal susceptor sleeve surface and an opposite pair of annular susceptor sleeve end faces, said internal susceptor sleeve surface being in intimate contact with said external solder lining surface,
   said solder lining extending beyond said susceptor sleeve along said induction weldable mounting centerline such that said opposite pair of annular solder lining rims are lateral to said opposite pair of annular susceptor sleeve end faces and extend radially outward with respect to said induction weldable mounting centerline for covering said opposite pair of annular susceptor sleeve end faces;
(b) a tubular cover mounted on said induction weldable mounting for peripherally enveloping same and having an opposite pair of annular induction weldable socket mouth rims lateral to said opposite pair of annular solder lining rims and thermally insulated from said opposite pair of susceptor sleeve end faces by said opposite pair of annular solder lining rims; and
(c) a tubular pipe tang mounted inside said induction weldable mounting for destining an induction weldable socket of said opposite pair of induction weldable sockets as an induction weldable pipe socket, the arrangement being such that said solder lining has an internal solder lining surface diameter requiring a forced sliding insertion of the pipe end into said induction weldable pipe socket, said pipe tang being dimensioned for sealing against the internal peripheral pipe surface and said opposite pair of annular induction weldable socket mouth rims being dimensioned for sealing against the external peripheral pipe surface on said sliding insertion of the pipe end into said induction weldable pipe socket, whereupon, on application of electromagnetic induction energy to the induction weldable pipe connector, said susceptor sleeve melts said solder lining, said melted solder lining being entrapped by said susceptor sleeve, said pipe tang and said opposite pair of annular induction weldable socket mouth rims thereby forming a welded sealed joint with the pipe end.

2. The connector according to claim 1 wherein at least one induction weldable socket mouth rim of said opposite pair of annular induction weldable socket mouth rims includes at least one aperture through which melted solder lining exudes therethrough co-directional with said induction weldable mounting centerline on said application of electromagnetic induction energy for providing a user indication regarding progress of an electromagnetic induction welding operation.

3. The connector according to claim 1 wherein said cover is spaced apart from said susceptor sleeve thereby providing air insulation therebetween for insulating said cover from being heated by said susceptor sleeve during an electromagnetic induction welding operation.

4. The connector according to claim 1 wherein said cover has ventilation holes for enabling natural convection cooling of the welded sealed joint.

5. The connector according to claim 1 wherein said cover includes a central narrow waist.

6. The connector according to claim 1 wherein said opposite pair of annular solder lining rims correspondingly wraparound said opposite pair of annular susceptor sleeve end faces for entrapping them therewithin and leaving a major part of said external susceptor sleeve surface therebetween exposed.

7. The connector according to claim 1 wherein the plastic pipe includes a beveled pipe end and said induction weldable mounting includes a central narrow waist such that said induction weldable pipe socket snugly receives the beveled pipe end.

8. The connector according to claim 1 wherein the plastic pipe is a multi-layer plastic pipe including an aluminum core layer sandwiched between an external plastic layer and an internal plastic layer, and said pipe tang includes at least one O ring for sealing against the plastic pipe's internal pipe surface.

9. The connector according to claim 1, further comprising at least one additional induction weldable pipe socket.

10. The connector according to claim 1, further comprising a connector end including a screw thread.

* * * * *